(12) United States Patent
Munsters et al.

(10) Patent No.: US 7,334,835 B2
(45) Date of Patent: Feb. 26, 2008

(54) OPEN ROOF CONSTRUCTION FOR A VEHICLE, AS WELL AS A VEHICLE HAVING SUCH OPEN ROOF CONSTRUCTION

(75) Inventors: Paulus J. W. Munsters, Uden (NL); Joseph P. J. Sanders, Cuyck (NL); Petrus M. J. Clephas, Sevenum (NL)

(73) Assignee: Inalfa Roof Systems Group B.V. (NL)

( * ) Notice: Subject to any disclaimer, the term of this patent is extended or adjusted under 35 U.S.C. 154(b) by 0 days.

(21) Appl. No.: 11/263,201

(22) Filed: Oct. 31, 2005

(65) Prior Publication Data

US 2006/0043775 A1 Mar. 2, 2006

Related U.S. Application Data

(62) Division of application No. 10/416,126, filed as application No. PCT/NL01/00814 on Nov. 9, 2001, now Pat. No. 7,063,372.

(30) Foreign Application Priority Data

Nov. 9, 2000 (NL) .................................. 1016578

(51) Int. Cl.
*B60J 7/06* (2006.01)
(52) U.S. Cl. ...................... 296/219; 296/224
(58) Field of Classification Search ............. 296/219, 296/220.01, 224

See application file for complete search history.

(56) References Cited

U.S. PATENT DOCUMENTS

| 3,333,362 | A | | 8/1967 | Kostin et al. ................. 49/248 |
| 5,016,939 | A | * | 5/1991 | Nishikawa et al. ......... 296/219 |
| 5,035,463 | A | | 7/1991 | Kato et al. ................... 296/233 |
| 5,054,847 | A | | 10/1991 | Asoh et al. ................. 296/219 |
| 5,058,944 | A | | 10/1991 | Kim ...................... 296/146.16 |
| 6,457,771 | B2 | | 10/2002 | Farber .................... 296/220.01 |

FOREIGN PATENT DOCUMENTS

| DE | 3808910 | 10/1989 |
| DE | 4113872 | 10/1992 |
| DE | 196 04 855 | 8/1997 |
| GB | 444 907 | 3/1936 |
| IT | 662106 | 4/1964 |
| WO | WO 01/14158 | 3/2001 |
| WO | WO 02/38407 | 5/2002 |

* cited by examiner

*Primary Examiner*—Dennis H. Pedder
(74) *Attorney, Agent, or Firm*—Steven M. Koehler; Westman, Champlin & Kelly, P.A.

(57) ABSTRACT

The invention relates to an open roof construction for a vehicle, as well as to a vehicle fitted with such an open roof construction, in particular a folding roof. More in particular, the invention relates to special features which make it possible to swing down the folding roof (1) into the boot (5) of the vehicle together with a rear window structure (2) so as to provide a convertible-like vehicle.

3 Claims, 22 Drawing Sheets

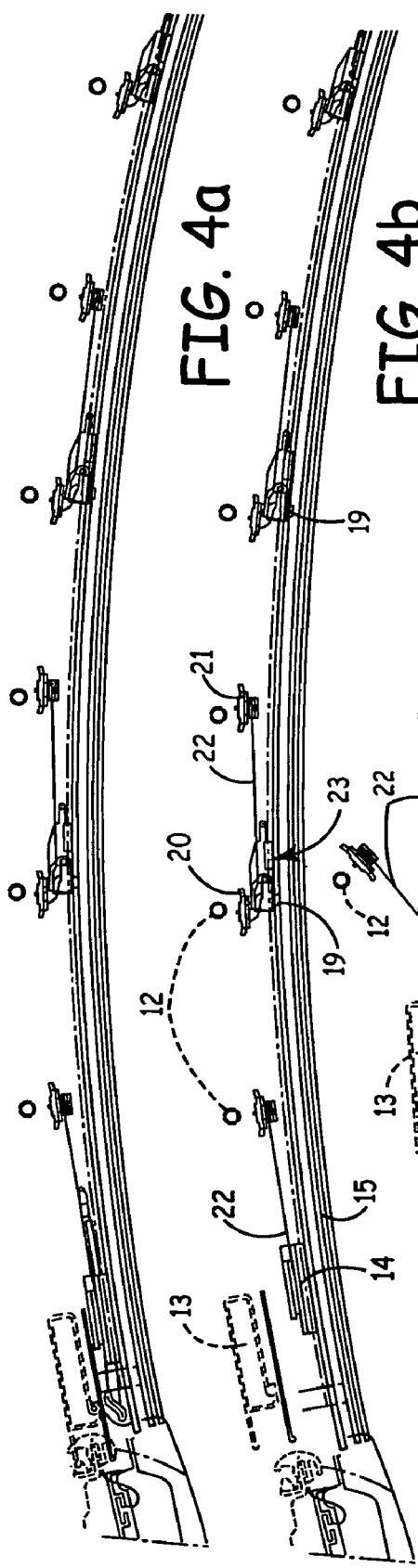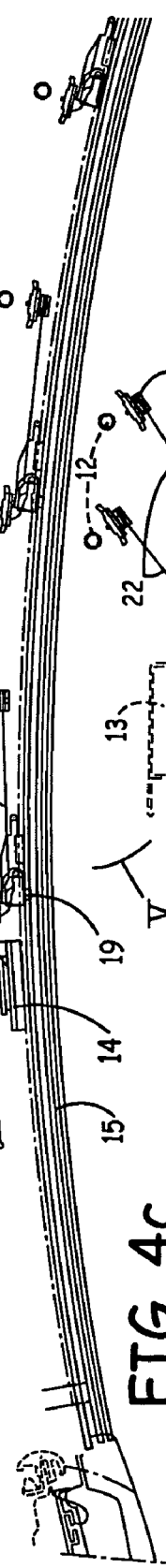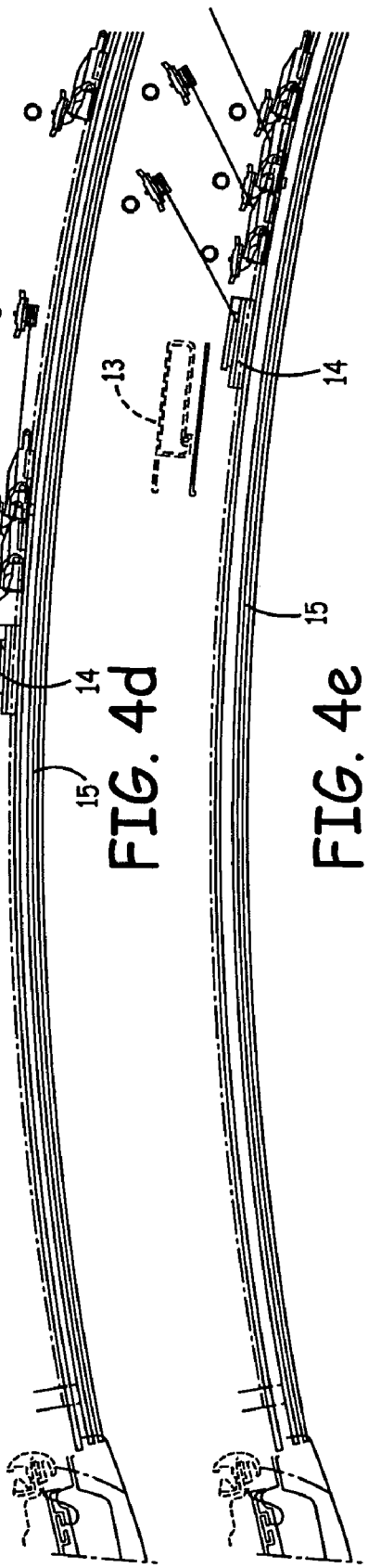

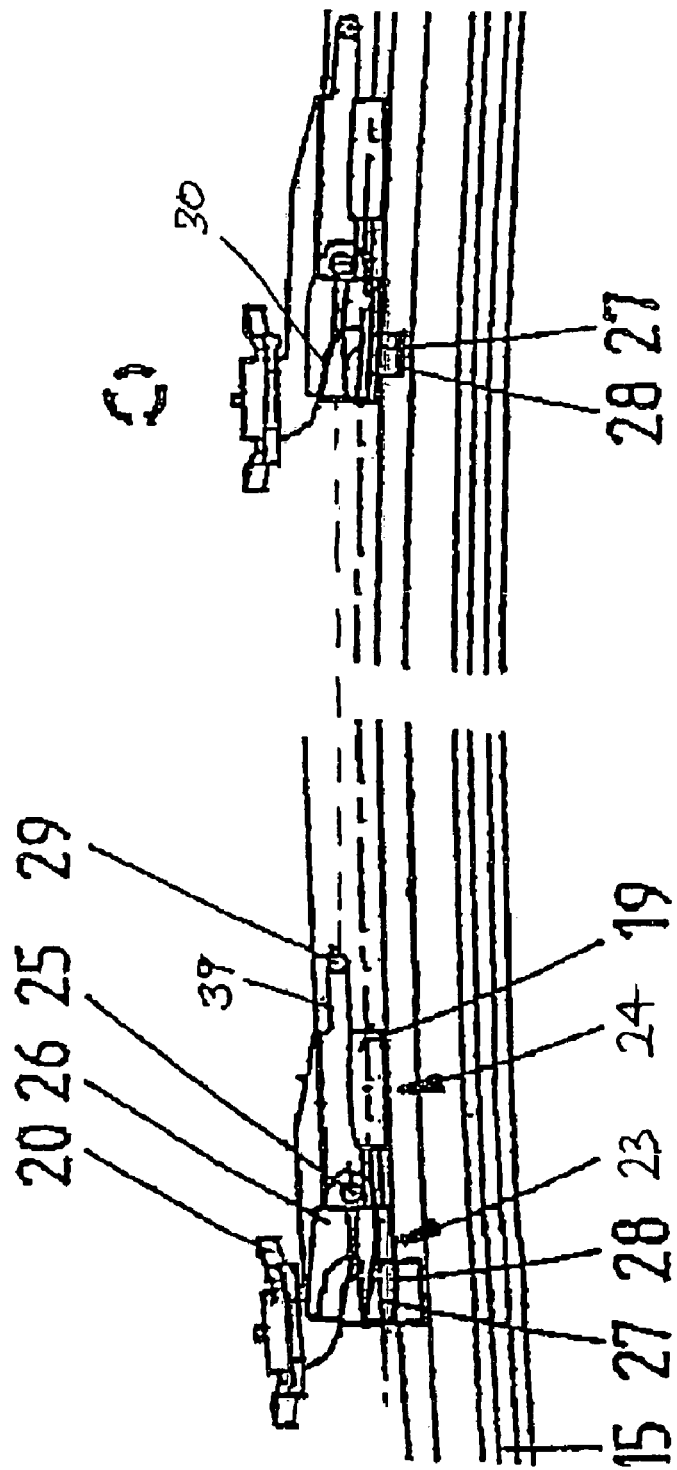

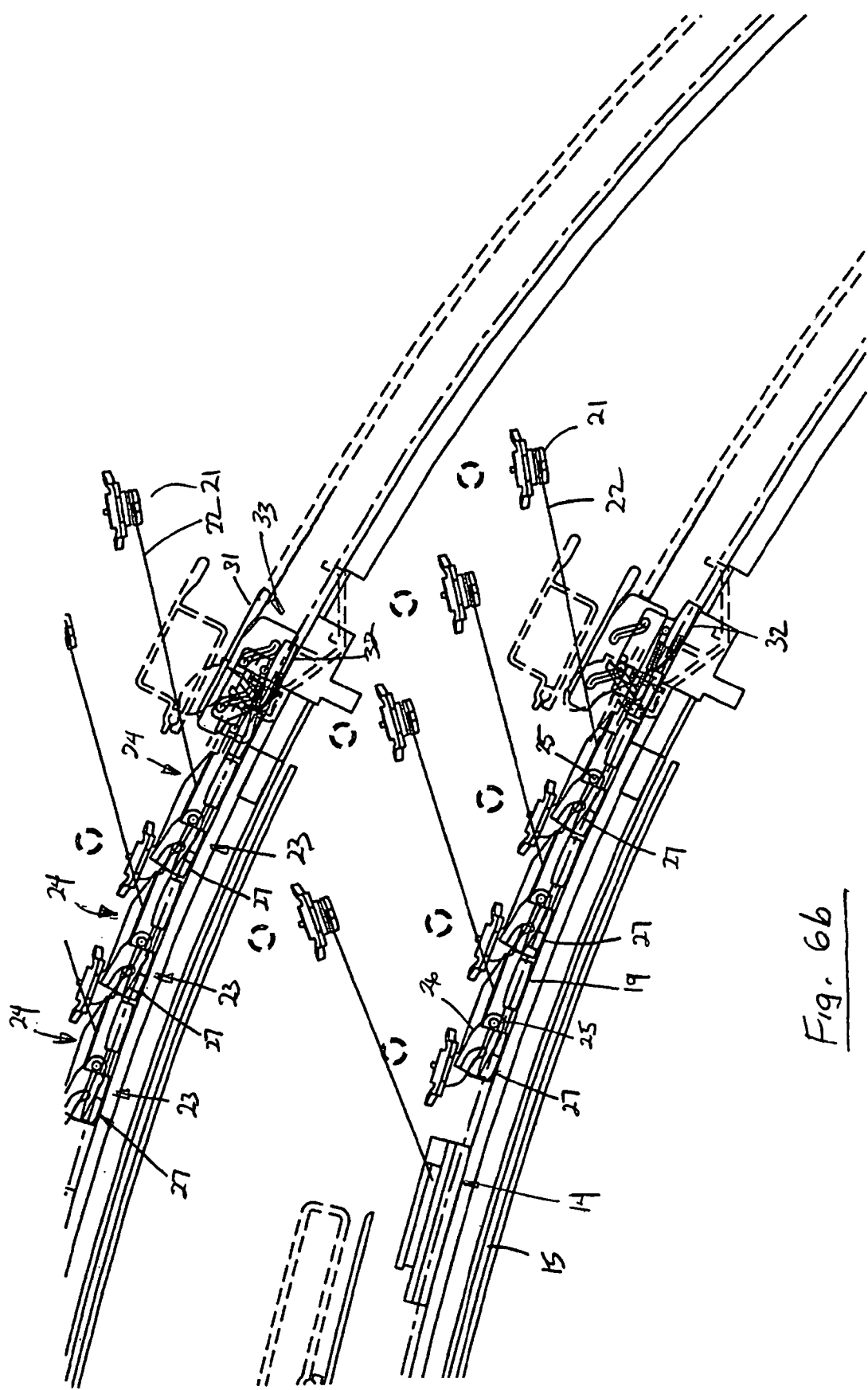

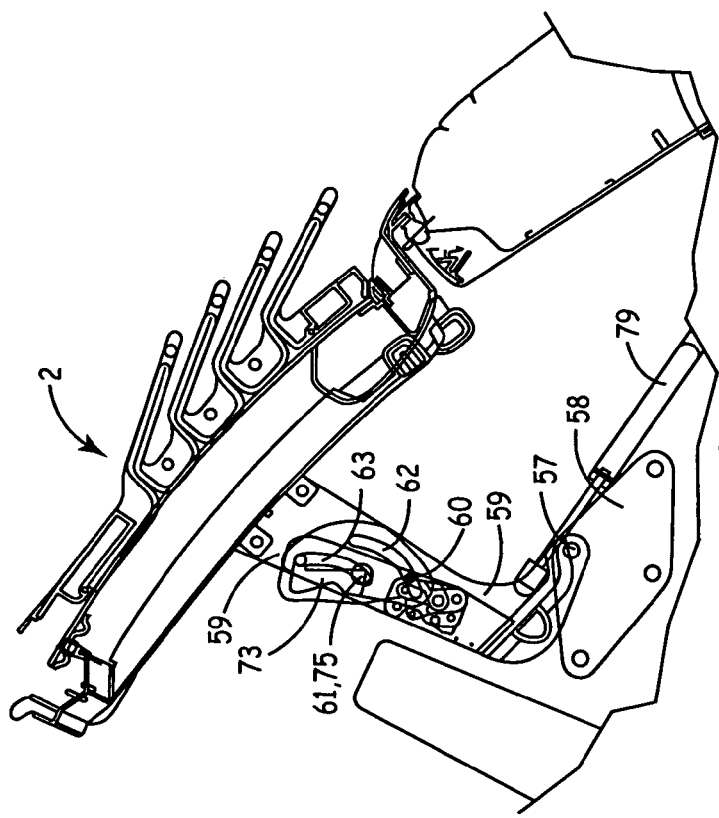
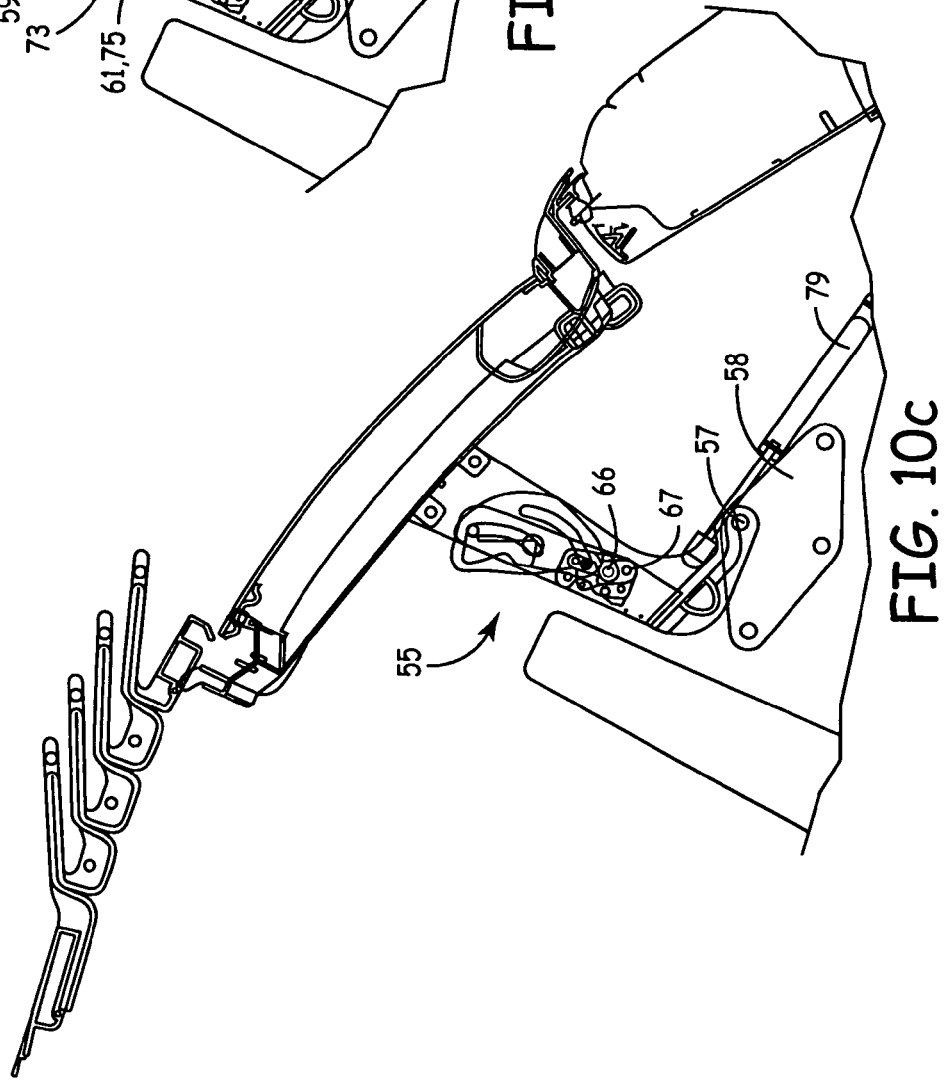
FIG. 10d
FIG. 10c

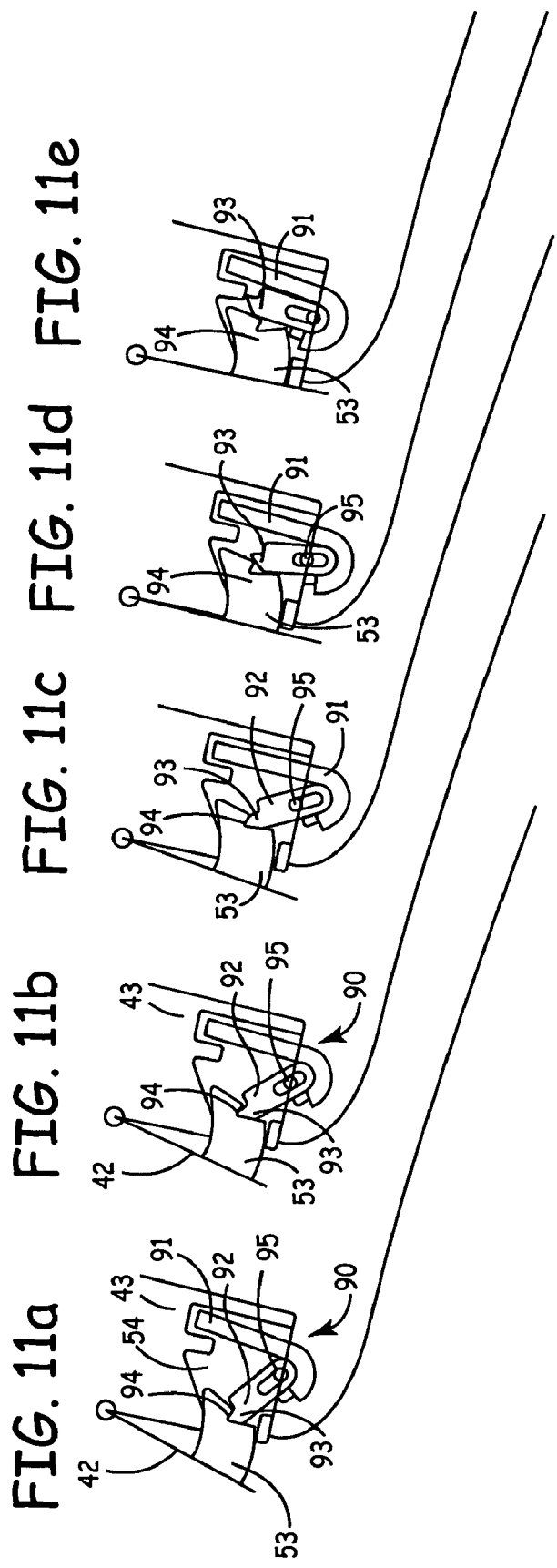

OPEN ROOF CONSTRUCTION FOR A VEHICLE, AS WELL AS A VEHICLE HAVING SUCH OPEN ROOF CONSTRUCTION

CROSS-REFERENCE TO RELATED APPLICATION

The present application is a divisional of and claims priority of U.S. patent application Ser. No. 10/416,126, filed Oct. 17, 2003, which is a Section 371 National Stage Application of International Application No. PCT/NL01/00814, filed Nov. 9, 2001 and published as WO 02/038407 on May 16, 2002, in English, the contents of each are hereby incorporated by reference in their entirety.

BACKGROUND OF THE INVENTION

The present invention relates to an open roof construction for a vehicle as well as to a vehicle fitted with such an open roof construction, in particular a folding roof.

SUMMARY OF THE INVENTION

The invention particularly relates to special features which make it possible to swing down the folding roof into the boot of the vehicle together with a rear window structure so as to provide a convertible-like vehicle.

BRIEF DESCRIPTION OF THE DRAWINGS

The invention will now be explained in more detail with reference to the drawings, which schematically show an embodiment of the open roof construction of a vehicle according to the invention.

FIGS. 4a-4e are larger-scale, longitudinal sectional views of one of the guide rails of the folding roof according to FIG. 1 and mating parts in various positions thereof.

FIGS. 5a-5c illustrate a yet larger-scale detail V of FIG. 4.

FIGS. 6a-6d illustrate longitudinal sectional views of the rear part of one of the guide rails and the front part of the rear window structure in various positions thereof before the folding roof moves onto the rear window structure.

FIGS. 10a-10f are longitudinal sectional views of the rear side of a vehicle fitted with the open roof construction according to the invention, in which various positions of the rear window structure are shown for the purpose of illustrating the operation thereof.

FIGS. 11a-11e are schematic longitudinal sectional views of the fittings and counter elements connected to the roof guide rail and rear window structure, respectively, in which various positions of these elements are shown to illustrate how the rear window is fitted and locked to the guide rail.

BRIEF DESCRIPTION OF THE ILLUSTRATIVE EMBODIMENTS

Figure 1:
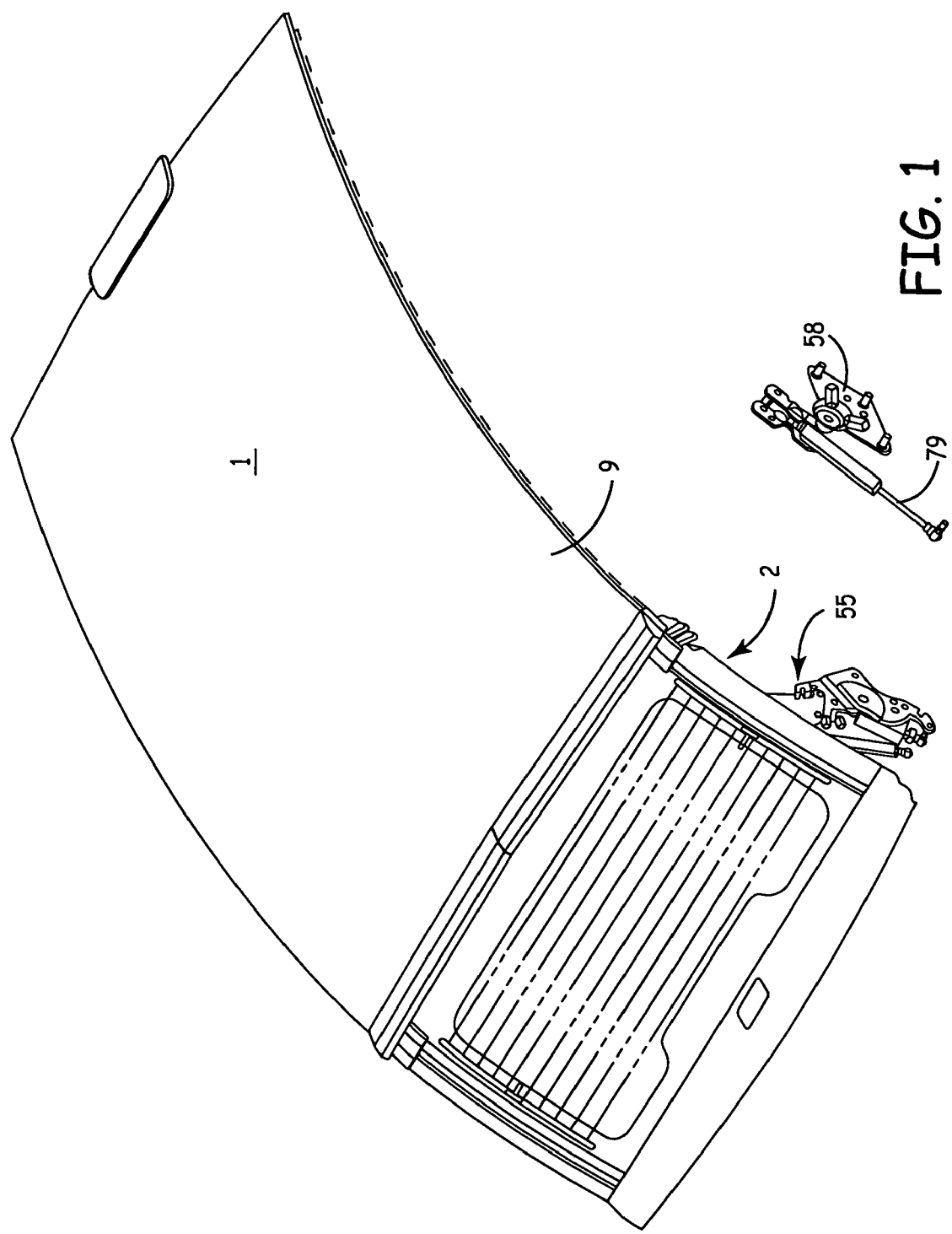
FIG. 1 is a general perspective view of the main components of the roof construction of a vehicle according to the invention.

FIG. 1 is a general view of the main components of the part of the vehicle to which the present invention relates. These main components function to provide various possibilities for "driving with an open top". The first main component according to the invention is a folding roof 1, which can be opened and closed in a usual manner. The second main component is the special rear window structure 2. Said rear window structure 2 is arranged for receiving the folding roof on the upper side in the open position of said folding roof, after which the rear window and the folding roof can be swung back as a whole into the vehicle boot, thus forming a convertible. In addition to that, the side arches (not shown) of the vehicle, which support the folding roof and the rear window, can be removed, so that a spider-like vehicle is obtained. Information about such a vehicle can be found in WO 01/14157, whose contents are incorporated herein by reference.

FIGS. 2a-2g show the operation of the rear window structure.

Figure 2A:
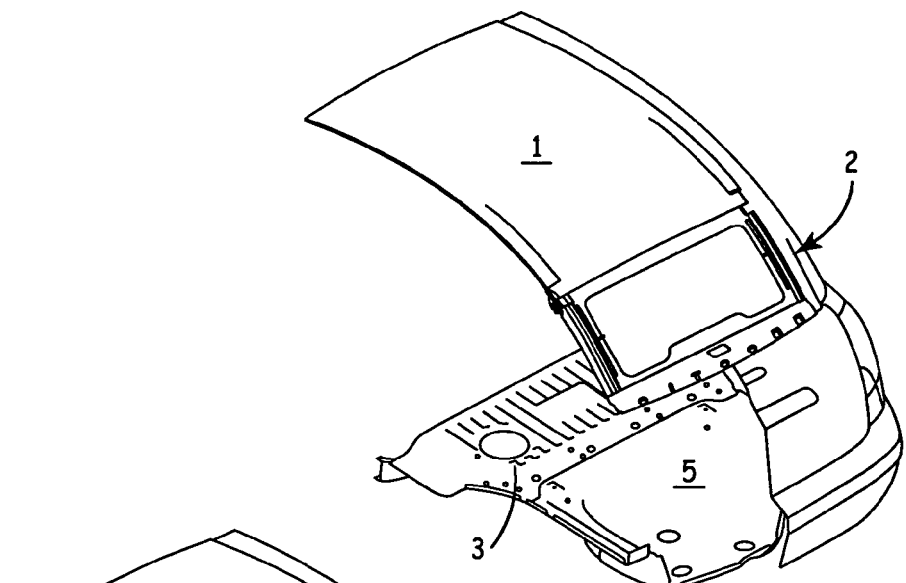
FIGS. 2a-2g are perspective views of the rear part of the vehicle according to the invention, showing the rear window structure and mating parts in seven different positions thereof.

FIG. 2a is a cut-away view of a portion of the rear side of the vehicle, showing the body 3, the rear seat 4 (FIG. 10f), the boot 5 and the boot lid 6.

In FIG. 2a, the folding roof 1, the rear window structure 2 and the boot lid 6 are in the closed position.

Figure 2B:
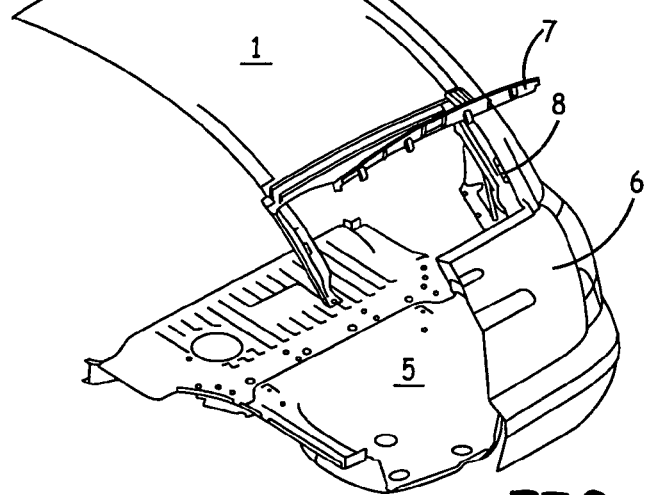

In FIG. 2b, the rear window 7 of the rear window structure 2 has been pivoted to an open position. A frame or cassette 8 of the rear window structure 2 remains locked in the closed position. In this way, the trunk can be made accessible.

Figure 2C:
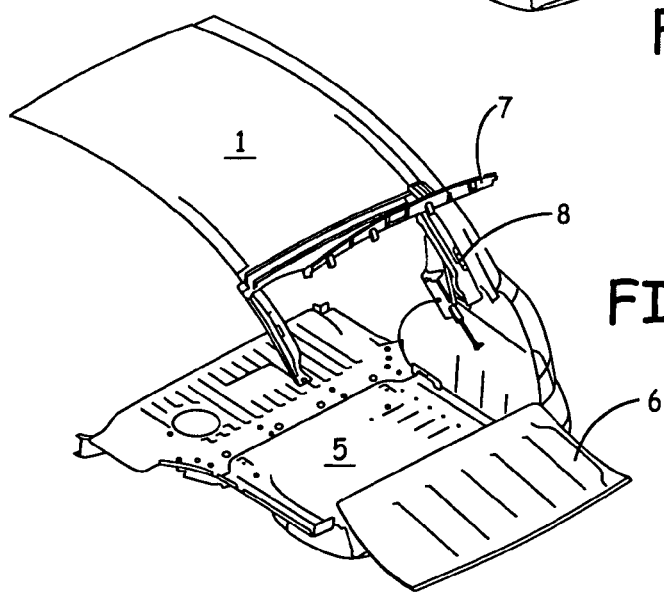

In FIG. 2c, the boot lid 6 has been opened to a horizontal position, in which the lid can be used as a floor part or supporting part.

Figure 2D:
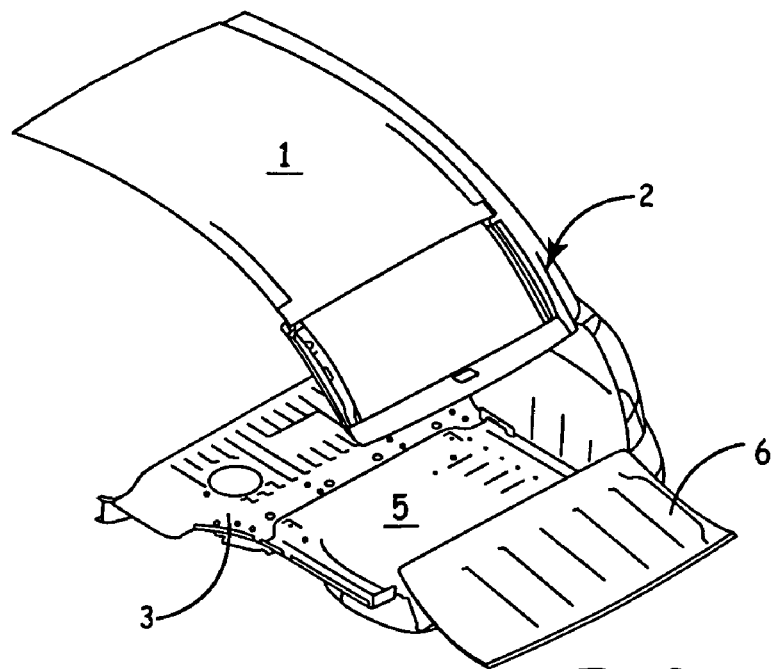

In FIG. 2d, the rear window 7 has been pivoted back to the closed position again, whereas the boot lid 6 is still open.

Figure 2E:
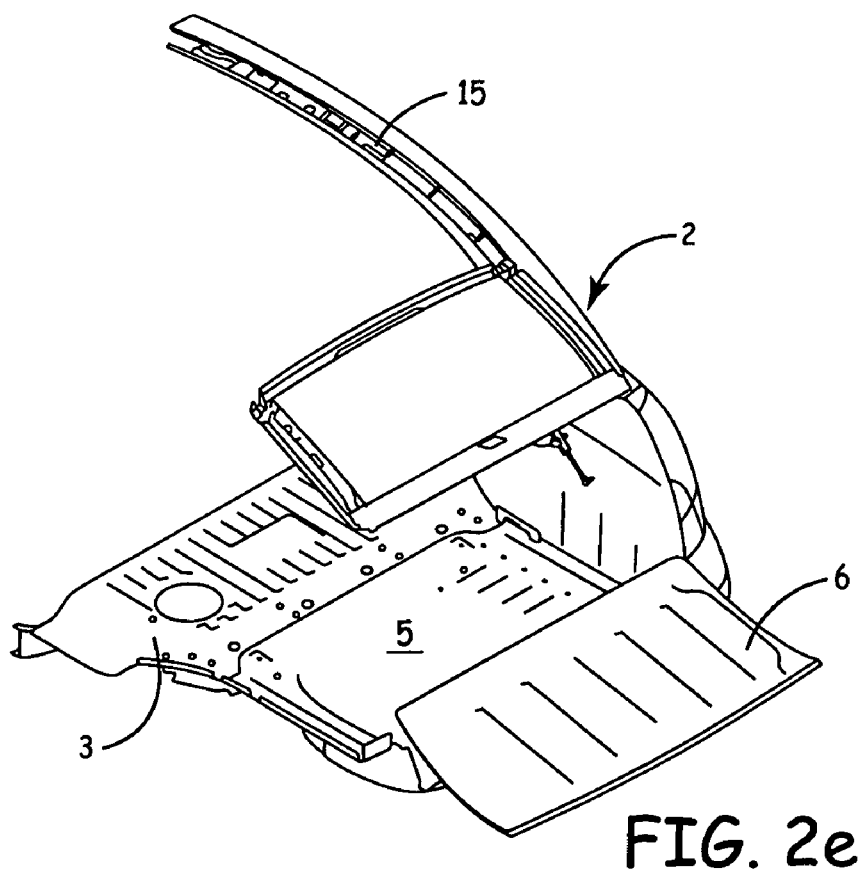

FIG. 2e shows a position in which the entire rear window structure 2, i.e. the frame 8 and the rear window 7 (as well as the open folding roof, which is not shown), after being unlocked, has been pivoted to an intermediate position, in which hinges to be described yet can become detached from a roof part co-operating therewith.

Figure 2F:
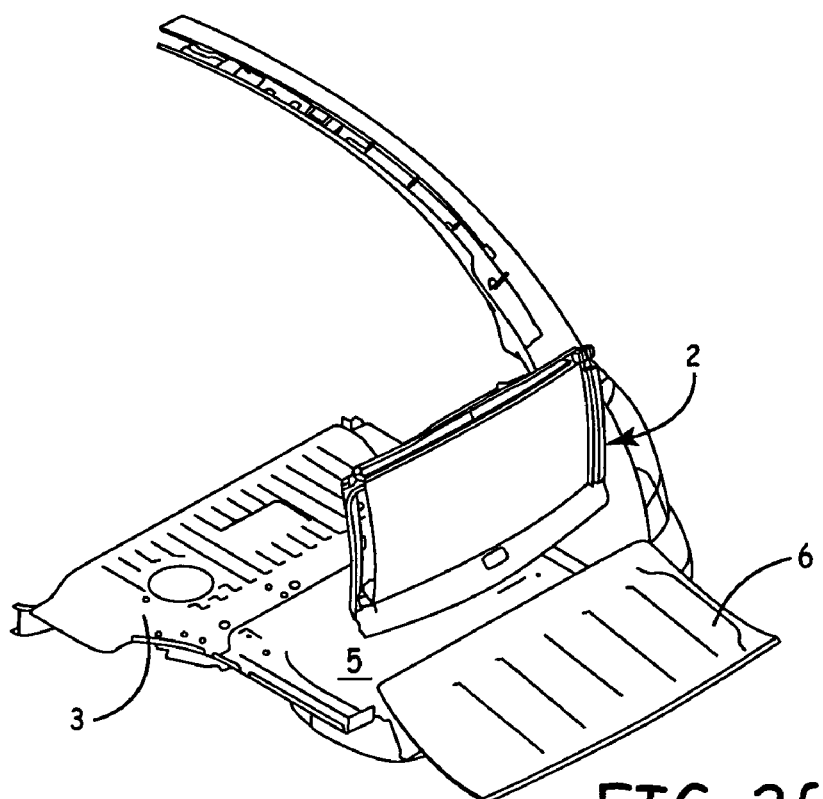

FIG. 2f shows the rear window structure 2 being pivoted downwards in its entirety by means of a special arm construction.

Figure 2G:
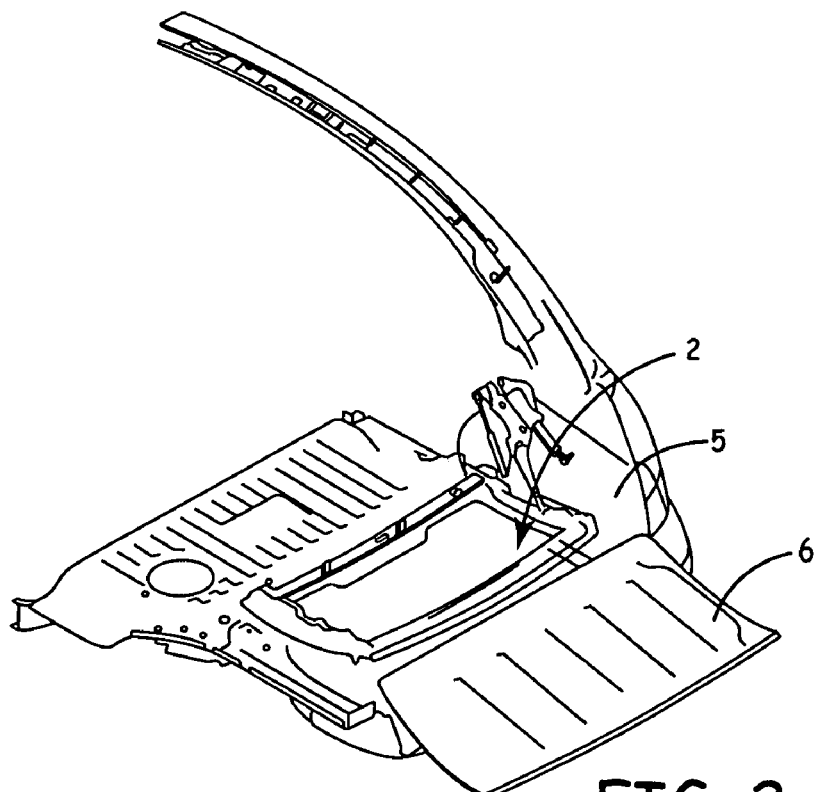

In FIG. 2g, the rear window structure 2 has been moved to a hollow space on the bottom of the boot 5, in which the rear window structure 2 is accommodated in a horizontal, upside-down position. The rear window structure 2 can be covered by a floor part (not shown), thus forming a boot which is ready for normal use again. In this position, it is also possible to close the boot lid 6.

Hereinafter, a description will be given of various parts of the special roof construction of the vehicle that assist in the aforesaid operation.

Figure 3:
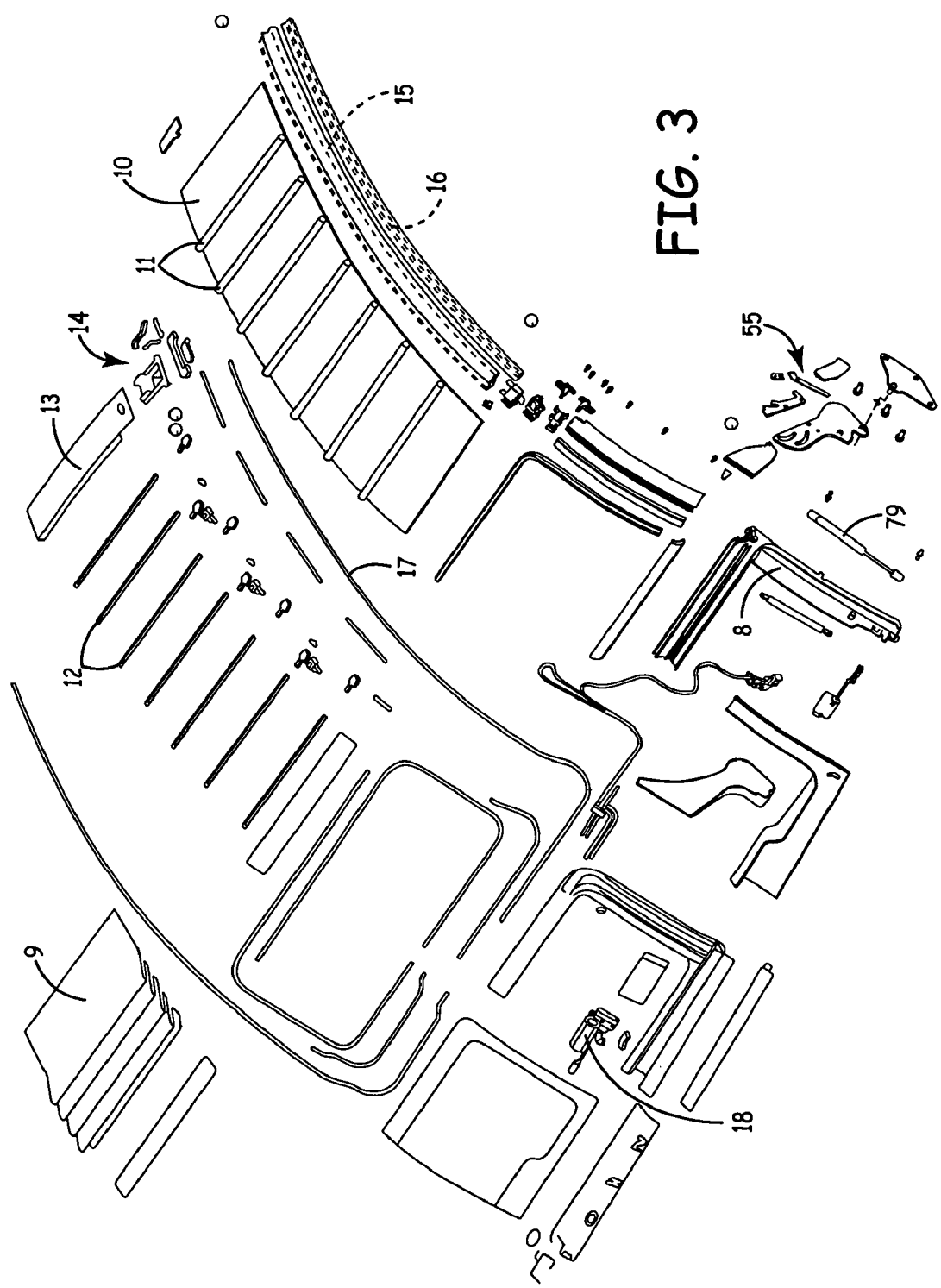
FIG. 3 is a perspective, exploded view of one longitudinal half of the roof construction according to FIG. 1.

FIG. 3 is an exploded view of the part of the main components of the roof construction according to the invention that are shown in FIG. 1.

The following parts of the folding roof 1 can be distinguished: a foldable liner 9, a lower cover 10 fixed to the underside thereof, which includes loops or sleeves 11 for receiving stiffeners 12. An operating beam 13, which controls the opening and closing of the folding roof, is arranged on the opening side of the liner 9, the front side in this case. To this end, the operating beam 13 is slidably guided in guide rails 15 by means of a special slide construction 14. The guide rails 15 are disposed on either side of a roof opening in the vehicle, in the longitudinal direction thereof. In this specific embodiment, the guide rails 15 are mounted on arch structures (not shown) at the sides of the vehicle and sealed by means of a seal 16. The slide constructions 14 at the ends of the operating beam 13 can be driven by means of driving cables 17, which are guided through the guide rails 15 towards the rear window structure 2, where a driving motor 18 is present.

The stiffeners 12 of the liner 9 are supported on slides that will be explained in more detail yet below.

Figure 5:
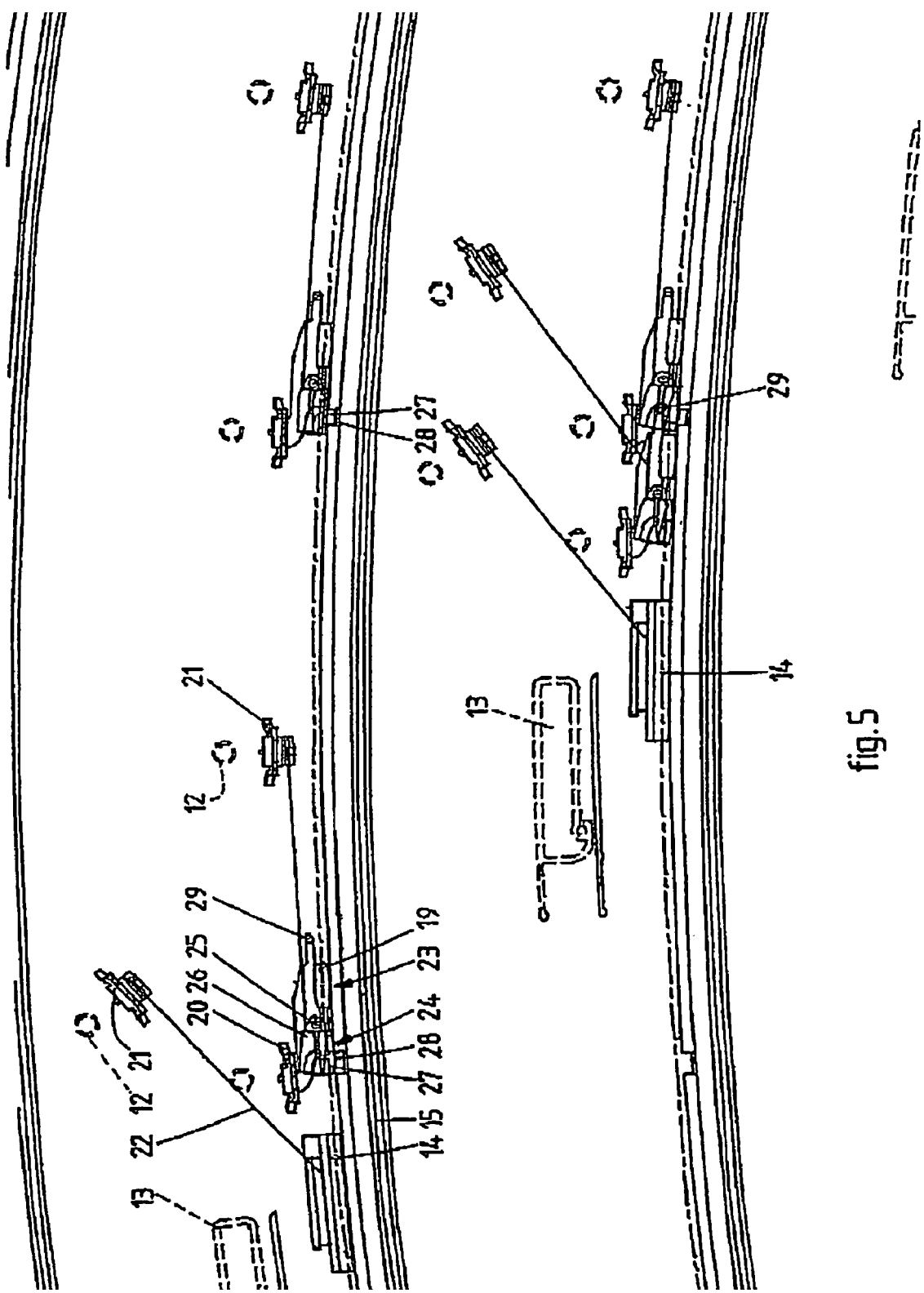
FIG. 5 illustrates a larger-scale detail V of FIG. 4.

FIGS. 4 and 5 are longitudinal sectional views of one of the guide rails 15 and the parts that are slidable therein. In addition to the guide rail 15, the operating beam 13 with the associated slide construction 14 as well as the stiffeners 12 can be distinguished. Some of the stiffeners 12 are arranged on a support 20 which is fixed to an associated slide, whereas other stiffeners 12 are arranged on supports 21 which are pivotally connected to an identical slide 19 via a leaf spring 22. The leaf springs 22 load the supports 21 in an upward direction. Upon rearward movement of the front slide construction 14, which likewise includes a leaf spring 22 and a support 21 with stiffener 12, and rearward movement of a slide 19, the liner 9 will be slackened, and the upwardly moving stiffener 12 will cause the liner 9 to extend upwards in a fold. This is shown in FIGS. 4a-4e.

Referring to FIGS. 5a-5c and 6a-6c, in order to ensure that a slide 19 will not start to move until a preceding slide 19 or the preceding slide construction 14 has moved so far rearwards that the fold is complete, each slide 19 is fitted with a locking assembly or elements 23, which mates with an associated counter element 28 in guide rail 15. The preceding slide 19 is provided with an unlocking assembly or elements 24 for unlocking the successive sliding shoes. In this embodiment, the locking elements 23 comprise a horizontally movable locking element 26, which is in particular pivotable about a horizontal pivot 25. Locking elements 23 further comprise a downwardly extending projection or cam 27, which can engage in a recess 28 in the bottom of the guide rail 15. This engagement of the cam 27 in the associated counter element or recess 28 takes place when the slide 19 in question has reached its frontmost position.

In order to be able to actuate the locking elements 23, the slide 14, 19, which is positioned in front of said locking element, seen in the opening direction, are fitted with projecting part 39 extending in the direction of the next sliding shoe 19, seen in the opening direction. Projecting part 39 includes pin 29 which can come into engagement with a slot 30 formed in the movable locking member 26 of locking elements 23. Said slot 30 extends in a direction that deviates from the direction of movement of the slide 19. This direction is such that the pin 29 of the preceding slide 14, 19 can enter the slot 30 in the position in which the cam 27 engages in the recess 28, whereas the movable locking member 26 is pivoted upwards about pivot 25 by the pin 29 upon passage through the slot 30, as a result of which the cam 27 will move out of the recess 28 and the slide 19 in question can start to follow the preceding slide 14, 19.

Since the projection or cam 27 runs on the bottom of the guide rail 15 in that situation, and the locking member 26 is thus locked in an upwardly pivoted position, the pin 29 of unlocking elements 24 is locked in position in the slot 30, so that the adjacent slides 14, 19 are locked into one unit. In this way, a very controlled folding movement of the folding roof 1 takes place.

Referring to FIGS. 1, 3, 5a-5c, and 6a-6d, in another embodiment, folding roof 1 for a vehicle has a roof opening comprising stationary guide rails 15 on either side of the roof opening. Guide rails 15 comprise counter elements 28 selectively positioned at locations along guide rails 15. In many embodiments, counter elements 28 are recesses within guide rails 15. Folding roof 1 further includes flexible liner 10 and drivable operating beam 13 on the opening side of said liner 10. Operating beam 13 is guided in guide rails 15 for selectively opening and closing the roof opening. Folding elements 21, 22 are mounted on slides 19 which are guided in said guide rails 15, Folding elements 21, 22 support liner 10 and define a folding movement thereof upon opening of folding roof 1. Slides 19 comprise locking assembly or elements 23 as well as unlocking assembly or elements 24. Counter elements 28 are positioned at such locations in guide rails 15 that locking elements 23, 27 can come into engagement with counter elements 26 when the slides 19 are in a frontmost position whereas unlocking elements 24, 29 unlock locking elements 23, 27 of the next slide 19, seen in the opening direction, when folding roof 1 is being opened.

Figure 5A:
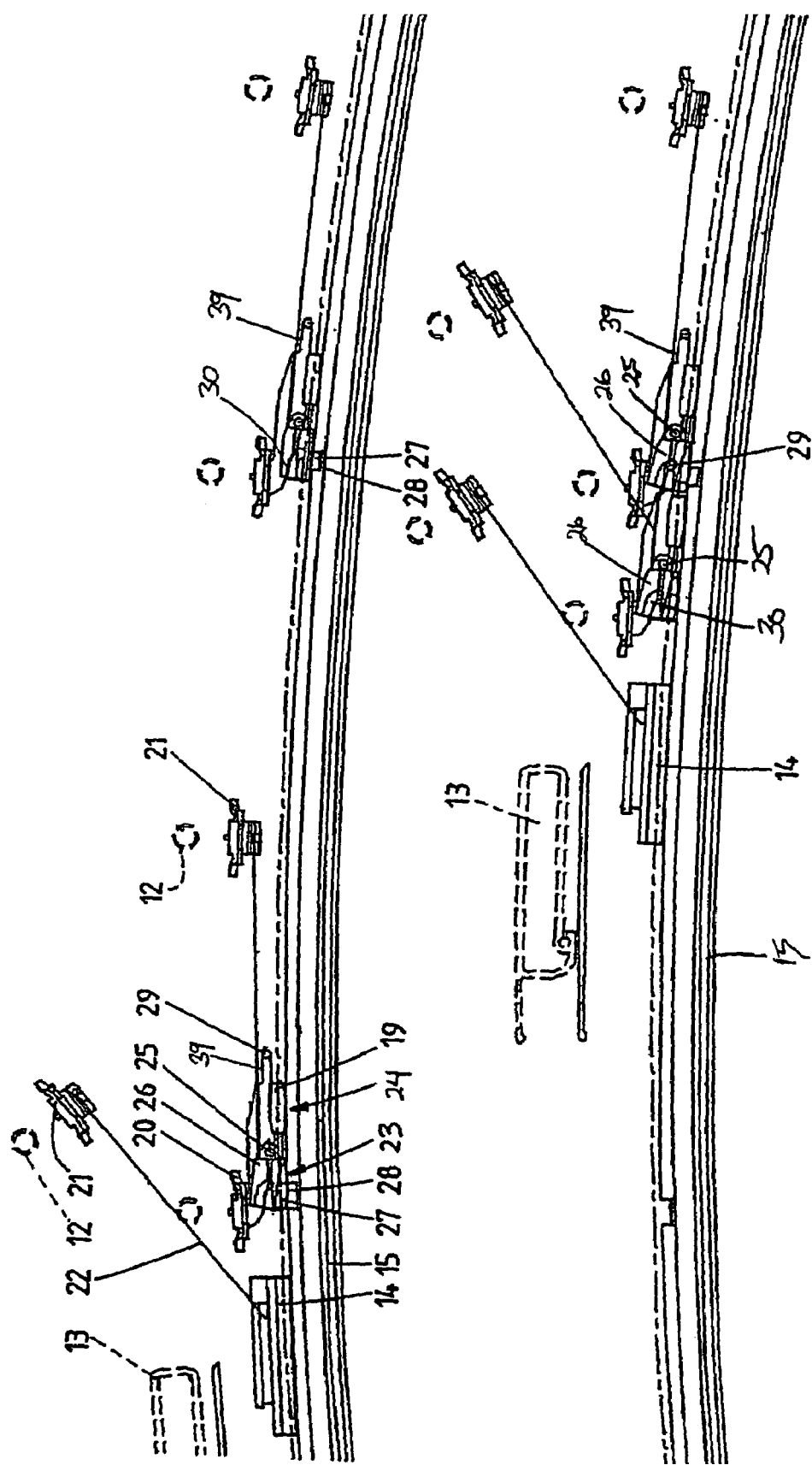
Figure 5C:
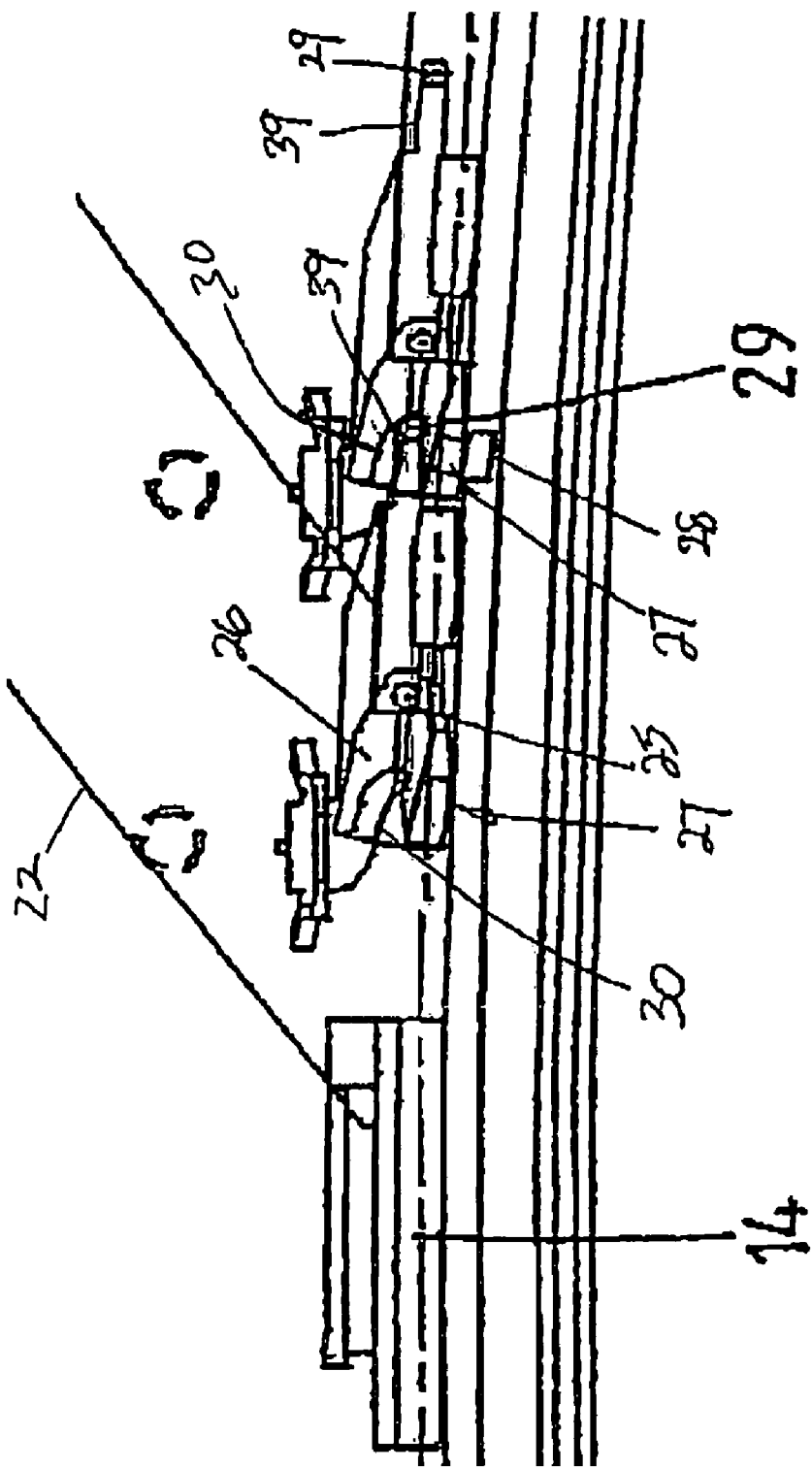
Figure 6A:
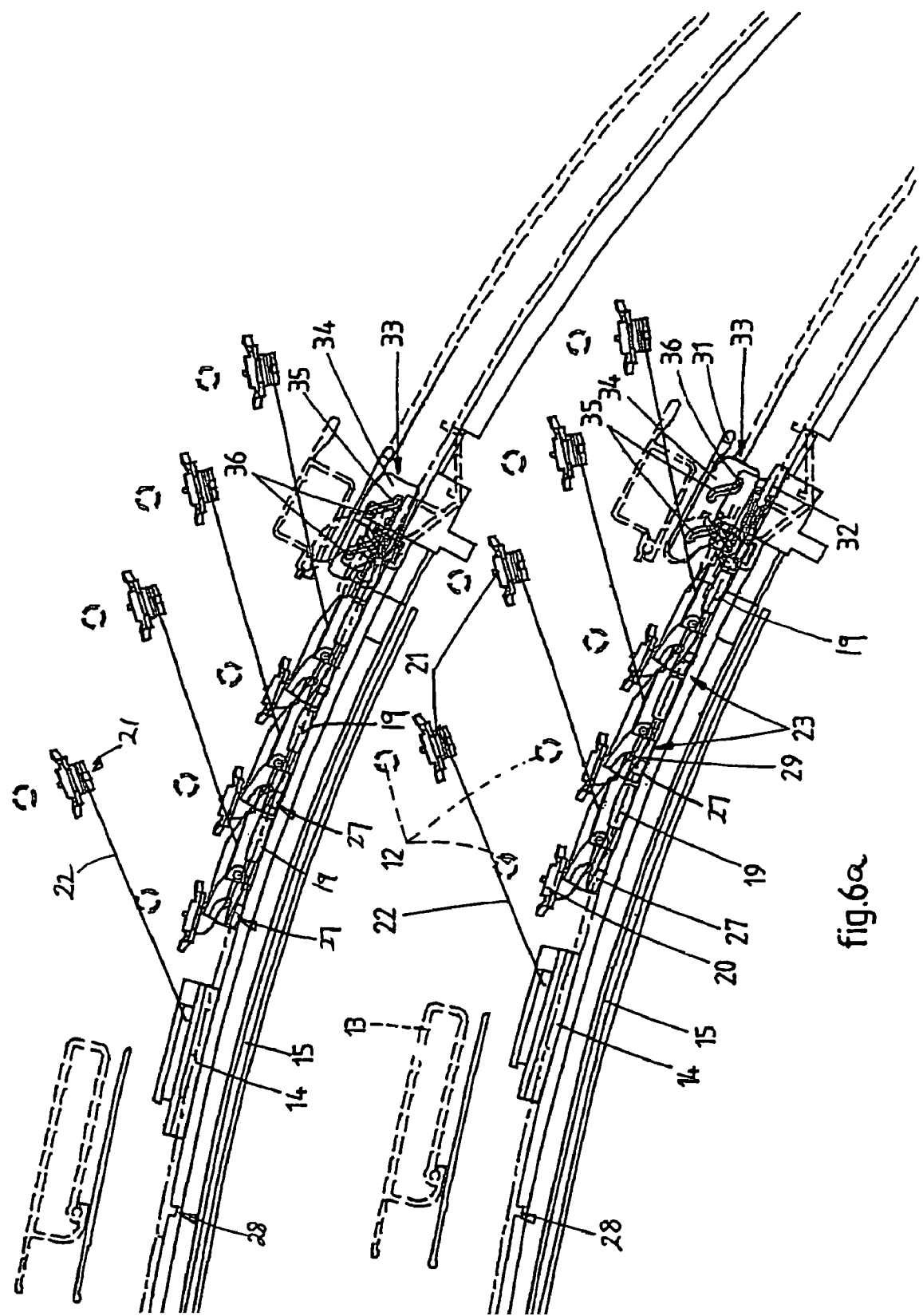
Figure 6C:
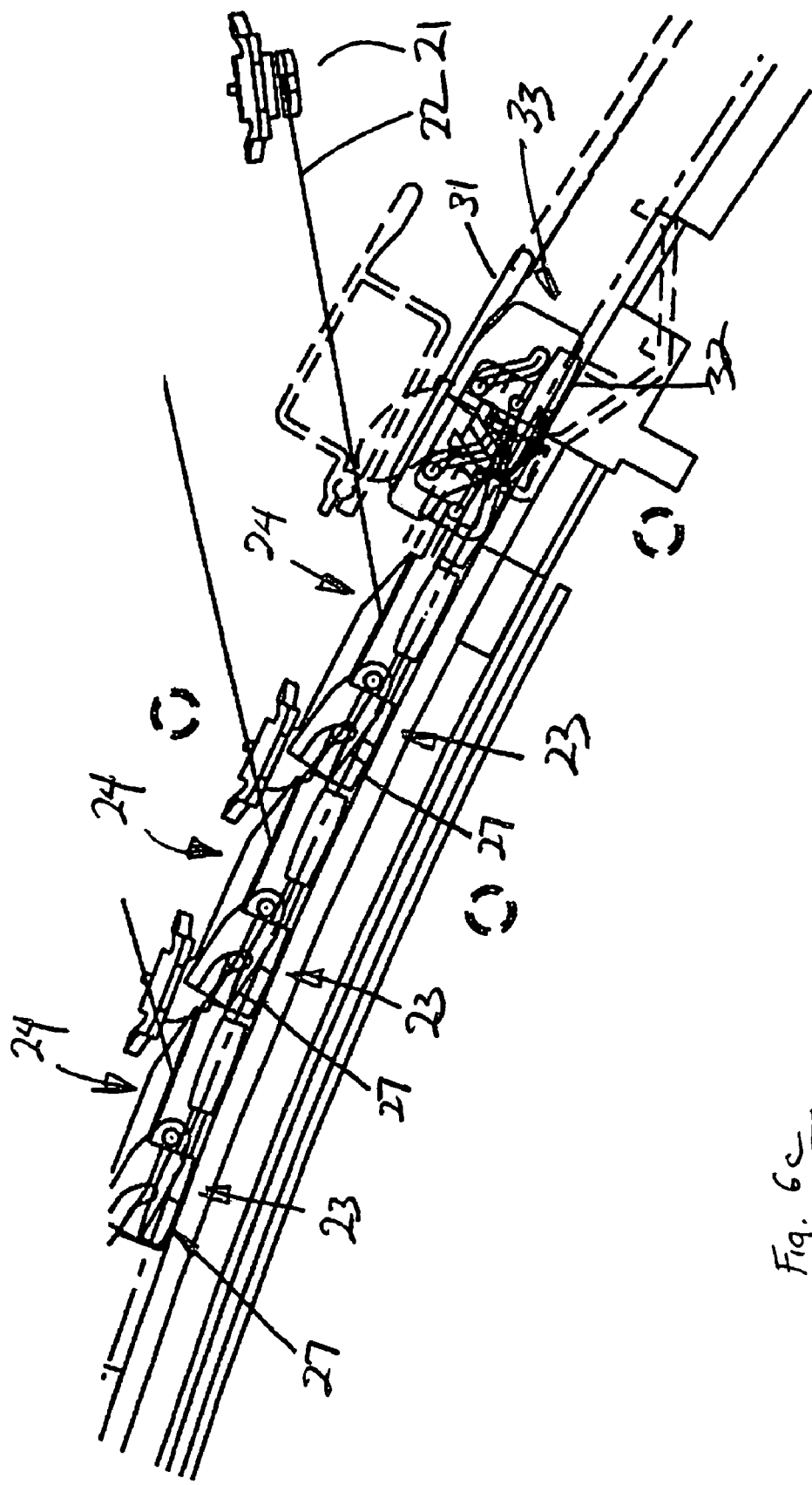
Figure 6D:
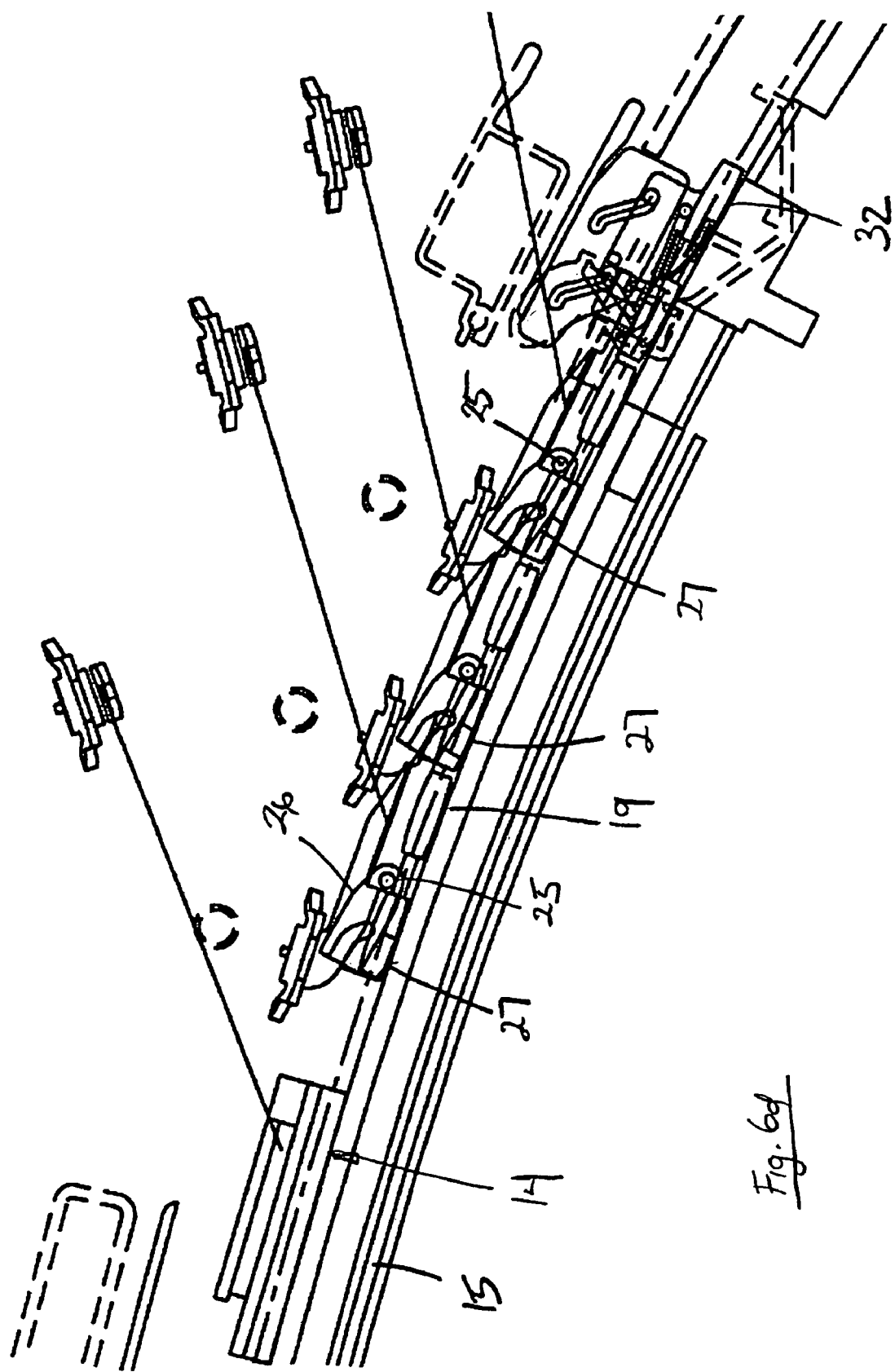

In still other embodiments, locking elements 23 comprise movable locking member 26 comprising projection 27, whereas counter element 28 is a recess in the guide rail 15, in which the projection 27 can engage as illustrated in FIGS. 5a-5c. Unlocking elements 24 can comprise projecting part 39 (illustrated in FIGS. 5a-5c which projects in the direction of the next slide, seen in the opening direction, which is capable of moving movable locking member 26 for the purpose of moving the projection 27 out of the recess 28. In other embodiments, projecting part 39 is provided with pin 29, which can come into engagement with slot 30 formed on movable locking member 26. Slot 30 can extend in a direction that deviates from the direction of movement of pin 29. In many embodiments, projecting part 39, pin 29, and slot 30 correspond to pin 114, lateral cam 113, and slot 111, respectively, as illustrated in FIGS. 12a-12f below.

Illustrated in FIGS. 5a-5c is a pivoting movement of movable locking member 26 about pivot 25 as pin 29 enters slot 30, which is illustrated as sloping downwards in FIGS. 5a-5c. Pin 29 comes in engagement with slot 30 and moves in a direction deviating from direction of slot 30 thereby causing movable locking member 26 to pivot about pivot 25. This pivoting movement causes projection or cam 27 to move out of counter element or recess 28. After projection or cam 27 is moved out of the counter element or recess 26, movable locking member 26 mates with guide rails 15 to lock pin 29 in slot 30, so that adjacent slides 19 are locked into one unit.

As already mentioned before with reference to FIGS. 1 and 2, the folding roof 1 can be moved to a position on the rear window structure 2 in the entirely open position, so that the folding roof 1 can be swung back into the boot 5 together with the rear window structure 2. First of all, the folding roof 1 will have to be detached from the guide rails 15 in order to make this possible. In the normal open and closed positions of the folding roof 1, a rear cover plate 31 (FIGS. 6a-6d) is present at the rear end thereof, which cover plate is stationary and which provides a seal with respect to the fixed roof. Said rear cover plate 31 is supported at the ends by slides 32 which are movable in the guide rails 15, each slide 32 comprising an unlocking and vertical adjusting mechanism 33 to be operated by an adjacent slide or sliding shoe 19 of the folding roof for moving the cover plate 31 upwards before the folding roof 1, which is locked into a unit in the entirely open position, can be moved further to a position on the rear window structure 2. Height or vertical adjusting mechanism 33 comprises a link plate 34 at each end of the cover plate 31, in which two identical slots 35 are present, in which pins 36 of the slide 32 engage.

Referring to FIGS. 1, 3, and 6a-6d, in another embodiment, folding roof 1 for a vehicle has a roof opening in its fixed roof. Folding roof 1 comprises stationary guide rails 15 on either side of the roof opening and flexible liner 10. Folding roof 1 further includes drivable operating beam 13 on the opening side of liner 10. Operating beam 13 is guided in guide rails 15 for selectively opening and closing the roof opening. A number of folding elements 21, 22 are provided to support liner 10 and which define a folding movement thereof upon opening of folding roof 1. Folding elements 21, 22 are mounted on slides 14, 19 which are guided in guide rails 15. Cover plate 31 on the side of liner 10 remote from the opening side provides a seal against the fixed roof. Slides 14, 19 and cover plate 31 of the open roof construction interlock to form one unit (14, 19, 31) in an entirely open position, after which they can be moved further as a unit. Cover plate 31 is mounted on slides 32 capable of sliding movement in guide rails 15, which each comprise height adjusting mechanism 33 (illustrated in FIGS. 6a-6d) to be actuated by adjacent rear slide 19 for moving cover plate 31 upwards (FIG. 6d) before further movement the aforesaid unit (14, 19, 31) is possible.

In still other embodiments, height adjusting mechanism 33 includes, at least one pinslot connection. In these embodiments, slide 32 comprises two pins that engage two corresponding slots 35 of cover plate 31. In still other embodiment, each slide 32 of cover plate 31 comprises a coupling element for coupling adjacent slide 19 to cover plate 31 in the entirely open position of the folding roof.

As already mentioned before with reference to FIGS. 1 and 2, the folding roof 1 can be moved to a position on the rear window structure 2 in the entirely open position, so that the folding roof 1 can be swung back into the boot 5 together with the rear window structure 2. First of all, the folding roof 1 will have to be detached from the guide rails 5 in order to make this possible. In the normal open and closed positions of the folding roof 1, a rear cover plate 31 (FIG. 6) is present at the rear end thereof, which cover plate is stationary and which provides a seal with respect to the fixed roof. Said rear cover plate 31 is supported at the ends by slides 32 which are movable in the guide rails 15, each slide 32 comprising an unlocking and vertical adjusting mechanism 33 to be operated by an adjacent sliding shoe 19 of the folding roof for moving the cover plate 31 upwards before the folding roof 1, which is locked into a unit in the entirely open position, can be moved further to a position on the rear window structure 2. The vertical adjusting mechanism 33 comprises a link plate 34 at each end of the cover plate 31, in which two identical slots 35 are present, in which pins 36 of the slide 32 engage.

As has been described in the foregoing, the driving cables 17 of the folding roof 1 extend from the guide rails 15 into the rear window structure 2, in which the driving motor 18 is present. The purpose of this arrangement is to pull the folding roof unit onto the rear window structure 2 as a unit in the entirely open position that is shown in FIG. 6. To this end, the rear window structure 2 includes guide rails 40 on either side (FIG. 7), which are aligned with the guide rails 15 in the closed position of the rear window structure 2.

It has been described with reference to FIGS. 2b and 2c that the rear window 7 of the rear window structure 2 can be pivoted upwards, in which case the driving cables 17 extending through the guide rails 15 and 40 need to pass through a bend. The special pull/push cables 17 cannot pass through a bend having a radius of curvature other than a specifically defined one, however. In order to ensure that the cables 17 will pass through a bend having a fairly small radius of curvature upon pivoting of the rear window 7, a special hinge assembly 41 is fitted between the guide rails 15 and 40.

Figure 7:
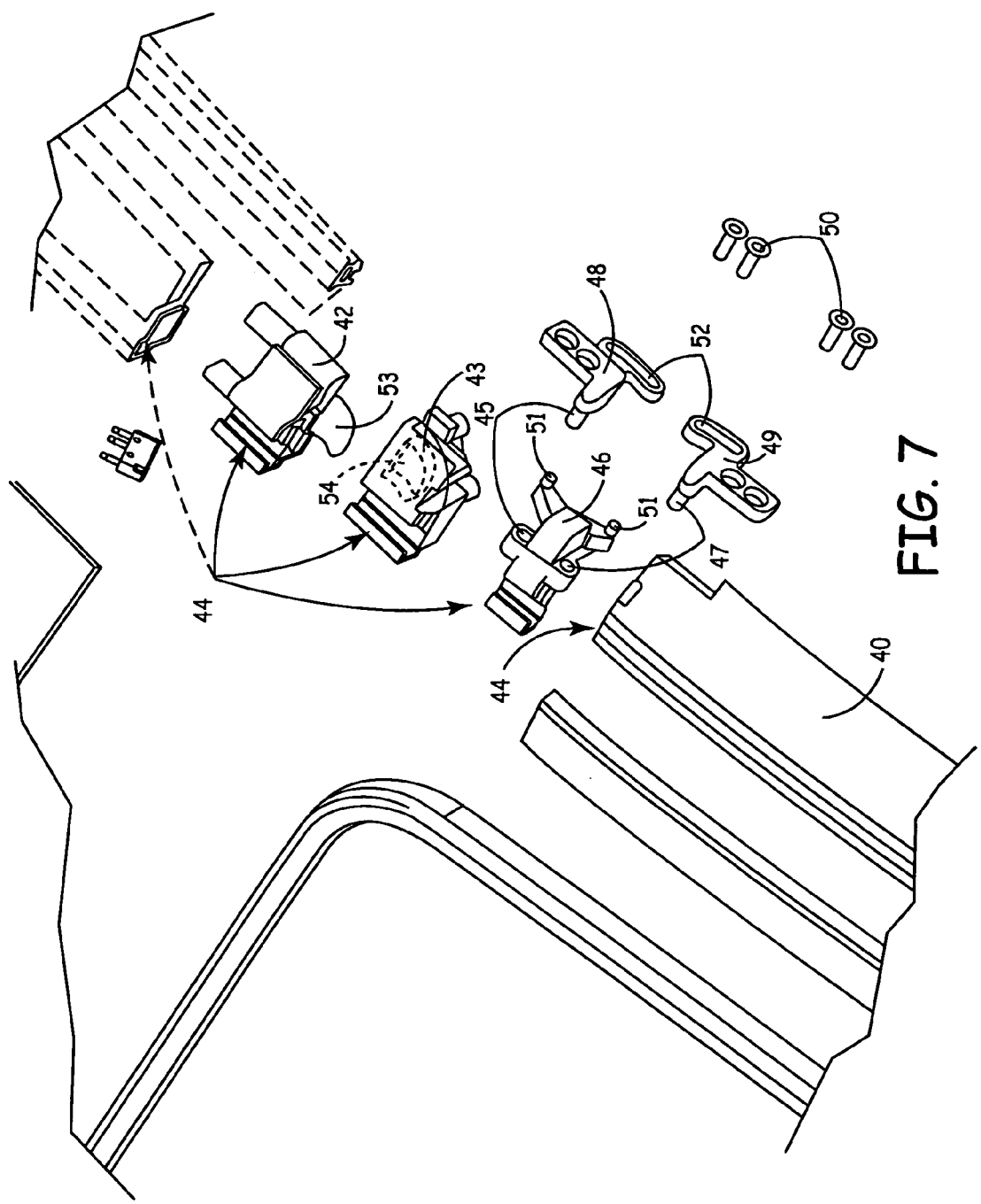
FIG. 7 is a perspective, exploded view of the rear part of the guide rail and the transition to the rear window structure.
Figure 8:
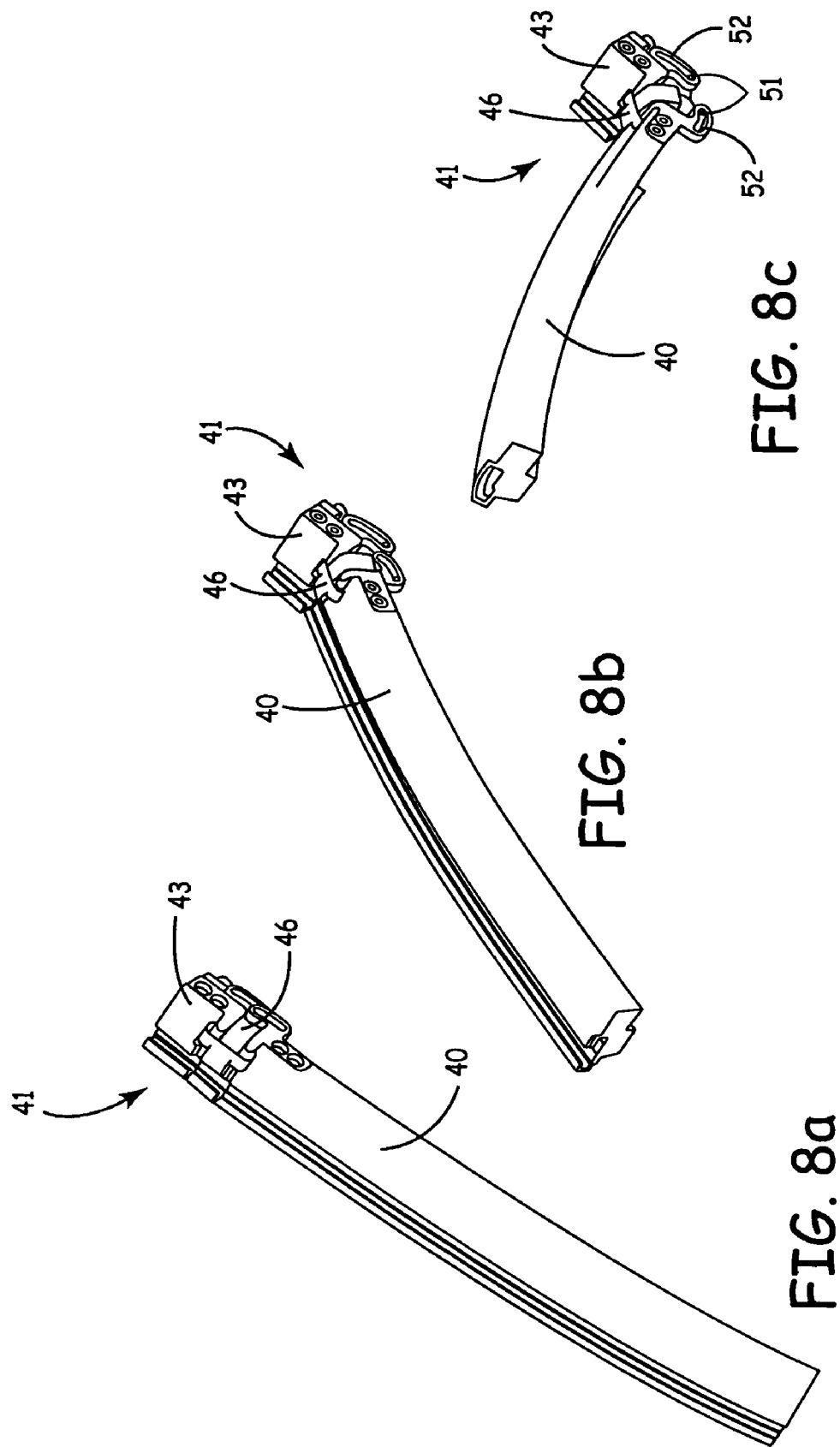
FIGS. 8a-8c are perspective views of the transition from the guide rail to the rear window structure, showing various positions thereof to illustrate the operation of a hinge construction arranged therebetween.

FIGS. 7 and 8 show the construction and the operation of the hinge assembly 41. In FIG. 7, the guide rails 15 and 40 as well as part of the rear window 7 of the rear window structure 2 can be distinguished. The end of the guide rails 15 that faces towards the rear window structure 2 terminates in a fitting element 42, which will be discussed in more detail yet. A counter element 43 is fixed to the fitting element 42 in the closed position of the rear window structure 2, and consequently said counter element 43 forms part of the guide rail 15, because a groove 44 that is present therein guides the various mutually aligned and adjoining slides 14, 19, 32.

The hinge assembly 41 comprises a first hinge 45, which connects the counter element 43 to an intermediate element 46, as well as a second hinge 47 which is spaced therefrom by some distance, which second hinge 47 enables a pivoting movement between the intermediate element 46 and the guide rail 40. The hinges 45 and 47 consist of pin-hole hinges, the holes being formed in the intermediate element 46, whereas the pin is formed on a separate part 48 and 49, respectively, which is fixed to, respectively, the counter element 43 and the guide rail 40, e.g. by means of screws 50. The intermediate element 46 and the parts 48 and 49 also include guide means and stop means in the form of two stop pins 51 on intermediate element 46, which are inserted in stop slots 52 in the parts 48, 49. Also other or additional stop means are conceivable, of course.

The effect that is achieved by using this hinge assembly 41 is that the virtual pivot point between the guide rails 15 and 40 will be located at a point inwardly spaced therefrom, or that the deflection of the guide rail is divided into two, as a result of which the angular distortion of the deflection is halved. The pivoting movement is such that the length of the part through which the cable 17 extends does not change. Preferably, the amount of space that is available for the cable 17 is such that the cable can pass through one large bend. FIGS. 8a-8c show the closed position of the rear window (FIG. 8a), the half open position, in which the rear window has pivoted through 40° with respect to the guide rail 15 (FIG. 8b), and the entirely open position, in which the rear window 7 has pivoted through 80° with respect to the guide rail 15 (FIG. 8c).

As has been described before, the various slides 14, 19 and 32 of the folding roof 1 must pass several transitions between parts upon transferring the folding roof unit between the guide rails 15 of the fixed roof and the guide rails 40 of the rear window structure 2, viz. from the guide rails 15 to the fitting element 42, the counter element 43, the intermediate element 46 and the guide rail 40. In order to provide an unimpeded passage, without upright edges being formed at the transitions due to tolerances that may be present, which edges impede or prevent the passage of the slides 14, 19 and 32, the grooves in the various parts of the guide rail 15 diverge slightly in transverse direction and/or in vertical direction at the ends that face towards each other in interconnected condition. In this way, the forming of upright edges at the transition is avoided, also in the case of a slight movement of the parts 15, 42, 43, 46 and 40 relative to each other. Thus, a smooth transition of the folding roof unit between the rear window structure 2 and the roof part is ensured.

As has already been mentioned before, the guide rails 15 and the rear window structure 2 are interconnected via the fitting element 42 and the guide rail 15 and the counter element 43 on the rear window structure. To this end, the fitting element 42 includes a hook-shaped member 53 (FIG. 7), which can engage in a mating locking recess 54 in the counter element 43. The hook-shaped member 53, and thus also the locking recess 54, are tapered in vertical direction and in transverse direction, as a result of which the hook-shaped member 53 readily fits in the locking recess and can be guided to an exactly defined positioned by the tapered walls of said recess 54, also when the fitting element 42 and the counter element 43 are not entirely correctly aligned. Alignment errors are corrected in this way, and it is ensured that each guide rail 40 of the rear window structure 2 properly adjoins the associated guide rail 15.

FIGS. 11a-11e show an improved version of the locking element 53 and the mating counter element 54. The locking element 53 is still in the form of a hook-shaped member, whereas the locking recess 54 forms the mating counter element. Both the hook-shaped locking element 53 and the locking recess 54 can be tapered both in a vertical direction and in a transverse direction.

This embodiment includes an additional retaining mechanism 90, which retains the locking element 53 in position in the locking recess 54 as long as the locking element 53 does not engage in the locking recess 54 sufficiently far. This makes it possible to prevent a situation in which one of the locking elements 53 slips out of the locking recess 54 again, causing dislocation of the rear window structure 2, partially due to the large weight and the resulting large moment thereof, when the rear window structure 2 is closed askew, for example because the vehicle is not in a level position or because the rear window structure 2 is pulled out of alignment by the person operating the construction.

The retaining mechanism 90 includes a retaining element 92 which is loaded by a tension spring 91, which element is inserted in locking recess 54 and which includes a nose 93 which is capable of engaging in a retaining recess 94 in the locking element 53. The retaining element 92 is slidable and pivotable about a traverse pin 95. In a starting position, the retaining element 92 extends obliquely in the direction of the opening of the locking recess 54, in which position it lies in the path of the locking element 53. The shape, the location and the movement of the parts is such that the following operation is obtained.

When the locking element 53 engages in the locking recess 54, the front side of the locking element 53 will come into contact with the nose 93 of the retaining element 92, so that the retaining element 92 will be pushed back slightly along the traverse pin 95 against the pressure of spring 91. If the locking element 53 engages sufficiently far in the locking recess 54, the nose 93 of the retaining element 92 will snap into the retaining recess 94. In this position, which is shown in FIG. 11a, it is no longer possible to move the locking element 53 out of the locking recess 54. The shape of the part of the locking element 53 that is positioned before the retaining recess causes said part to hook behind the nose 93. The retaining element 92 cannot pivot outwards, and the force on the retaining element 92 with respect to the traverse pin 95 is such that the retaining element will not be pushed back along the traverse pin 95. In this position, the locking element 53 is secured against "falling out or being pulled out", therefore.

If the locking element 53 is moved further into the locking recess 54, however, as is shown in FIG. 11b, the retaining element 92 will be pushed back by the locking element 53 and will be pivoted back about the traverse pin 95. As can be seen in FIGS. 11c and 11d, the nose 93 of the retaining element 92 will eventually move out of the retaining recess 54, which is made possible by the respective configurations of said element 53 and said recess 54.

In the entirely locked position according to FIG. 11e, the retaining element 92 abuts against the front side of the locking element 53, whereas the spring 91 keeps the retaining element 92 in its upwardly pulled position.

If the locking element 53 is moved out of the locking recess 54 from this position, the retaining element 92 will follow the pivoting movement of the locking element 53 in that the retaining element 92 will pivot rather than slide under the influence of the action of the spring 91. This prevents the nose 93 of the retaining element 92 from snapping into the retaining recess 94 in the locking element 53 again, so that the locking element 53 can be removed from the locking recess 54 without any problems.

Figure 9:
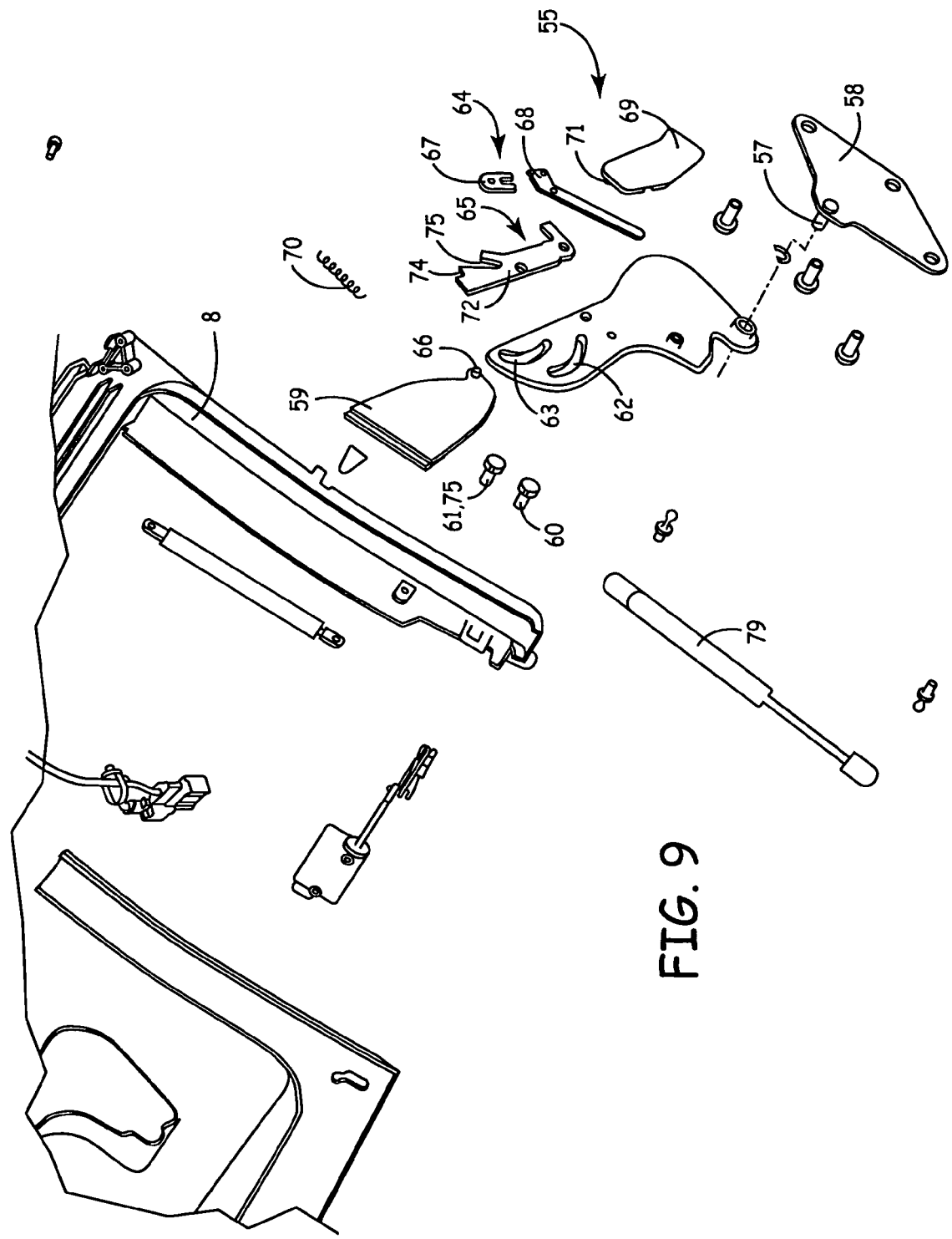
FIG. 9 is a larger-scale perspective, exploded view of one of the arms of the rear window structure according to FIG. 2.

FIG. 9 shows yet another main component of the special roof construction according to the invention, viz. one of the arms that are to pivot the rear window structure 2 from the closed position, in which it functions as the rear window, to the stored position in the boot 5 of the vehicle. In FIG. 9, the frame 8 of the rear window structure 2 can be distinguished; the arm consists of a first arm member 56, which is connected to a body part 58 by means of a pivot 57, as well as a second arm member 59, which is fixed to the frame 8 of the rear window structure 2. The arm members 56 and 59 are in engagement with each other by means of two pin-slot joints comprising pins 60 and 61 on the second arm member 59, which engage in associated slots 62 and 63 in the first arm member 56. The configuration of the slots 62 and 63 and the relative positions of the pins 60 and 61 determine the movement of two arm members relative to each other. Each arm 55 includes two locking means 64 and 65, the first locking means 64 function to lock the arm members 56, 59 in such a position relative to each other that the rear window structure 2 is locked in the position in which it functions as the rear window (FIG. 2a), whereas the second locking means 65 lock the arm members 56 and 59 from the intermediate position according to FIG. 2e to the stored position according to FIG. 2g.

The first locking means 64 comprise a locking pin 66 formed on lower end of the second arm member 59, as well as a latch 67 comprising a locking arm 68. The latch 67 and the locking arm 68 are arranged on a latch housing 69, which is connected to the arm member 56. A spring 70 keeps the locking arm 68 biased.

The second locking means 65 comprise a locking plate 72 which is spring-loaded in the direction of the locked position and which is pivotally connected to a first arm member 56 about a pin 71, in which locking plate a locking slot 73 including a locking portion 74 is present. The second locking means 65 furthermore comprise a second locking pin 75 on the second arm member 59, which is positioned in the locking portion 74 in the aforesaid intermediate position. The locking pin 75 forms part of the pin 61 in the illustrated embodiment A gas spring 79 or the like connected to the body 3 engages the first arm member 56, thus ensuring that a counter force is exerted on the arms 55 and the rear window structure 2, which facilitates the adjustment thereof.

The operation of the above-described arm 55 for the rear window structure is as follows. In the closed position of at least the frame 8 of the rear window structure 2, the second arm member 59 occupies its lower position with respect to the first arm member 56 (FIGS. 10a-d). In this position, the first locking pin 66 is retained in the latch 67 (see FIG. 10c), which is blocked by the locking arm 68 (not shown). The pins 60 and 61 of the first arm member 56 are present at the lower end of the associated slot 62 and 63, respectively. The second locking pin 75 is present at the lower end of the second locking slot 73. In this lower, locked position of the arms 55, the frame 8 of the rear window structure 2 is pressed firmly against its seal and retained in that position.

The locking arm 68 or the latch 67 of each arm 55 can be manually unlocked, after which the rear window structure 2 can be pivoted upwards about the hook-shaped member 53 of the fitting element 42, which functions as a hinge in this case. The pins 60 and 61 move through the associated slots 62 and 63, thus defining the relative movement between the arm members 56 and 59. The gas spring 79 exerts an upward moment on the associated arm 55, so that the weight of the rear window structure 2 is compensated and said upward pivoting does not require too much force. The moment about the pivot 57 decreases slightly upon movement of the arm members to the intermediate position, on account of the pivoting movement of the second arm member 59 about the pivot 57. The second locking pin 75 moves towards the locking portion 74 along the edge of the locking slot 73 in the locking plate 72.

Figure 10B:
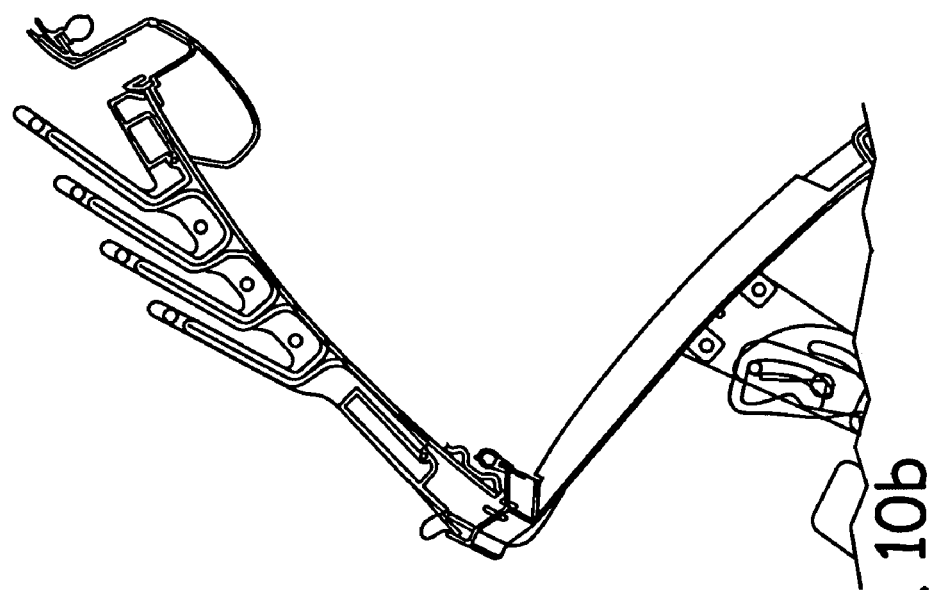
Figure 10A:
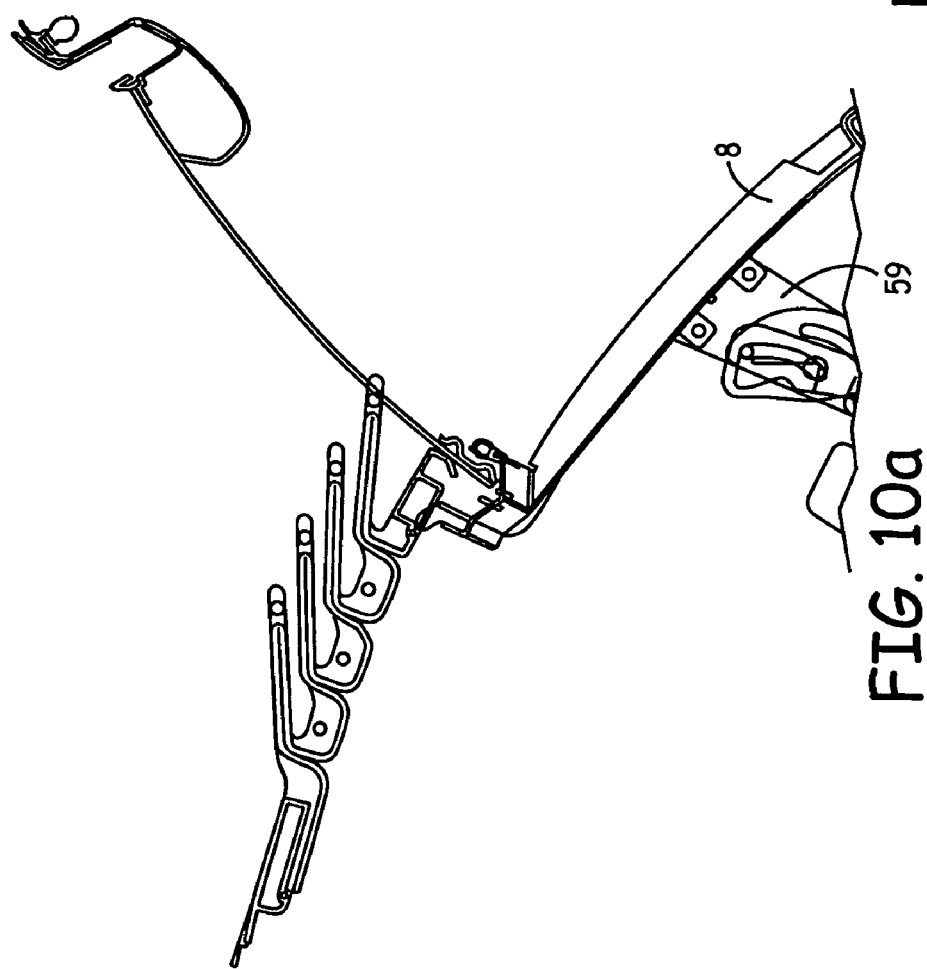
Figure 10E:
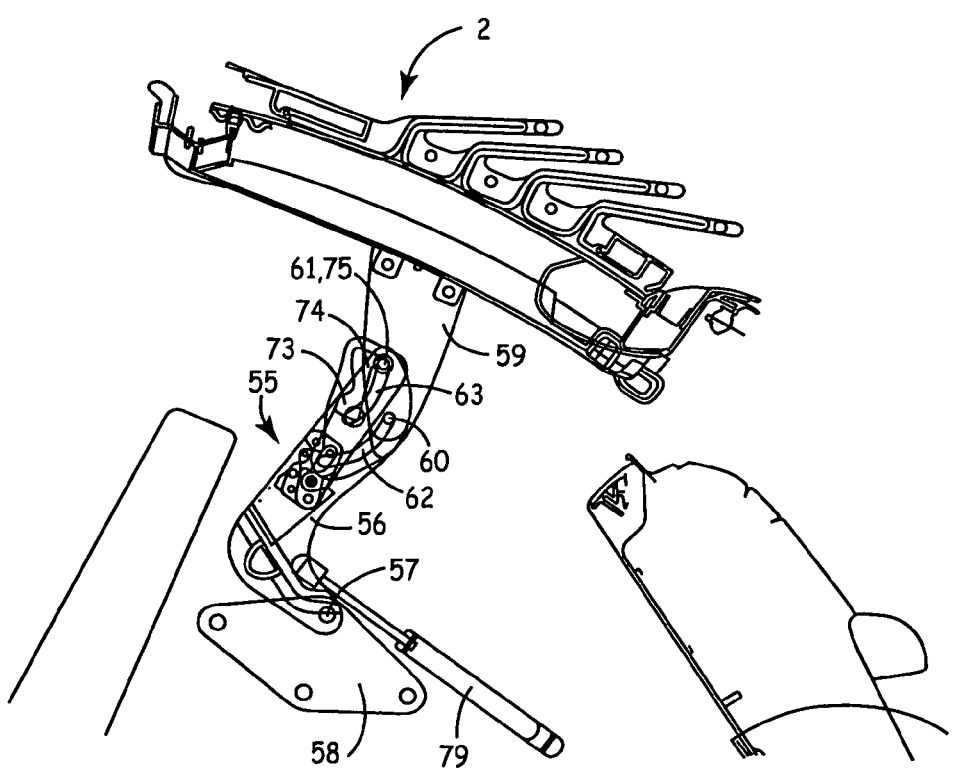
Figure 10F:
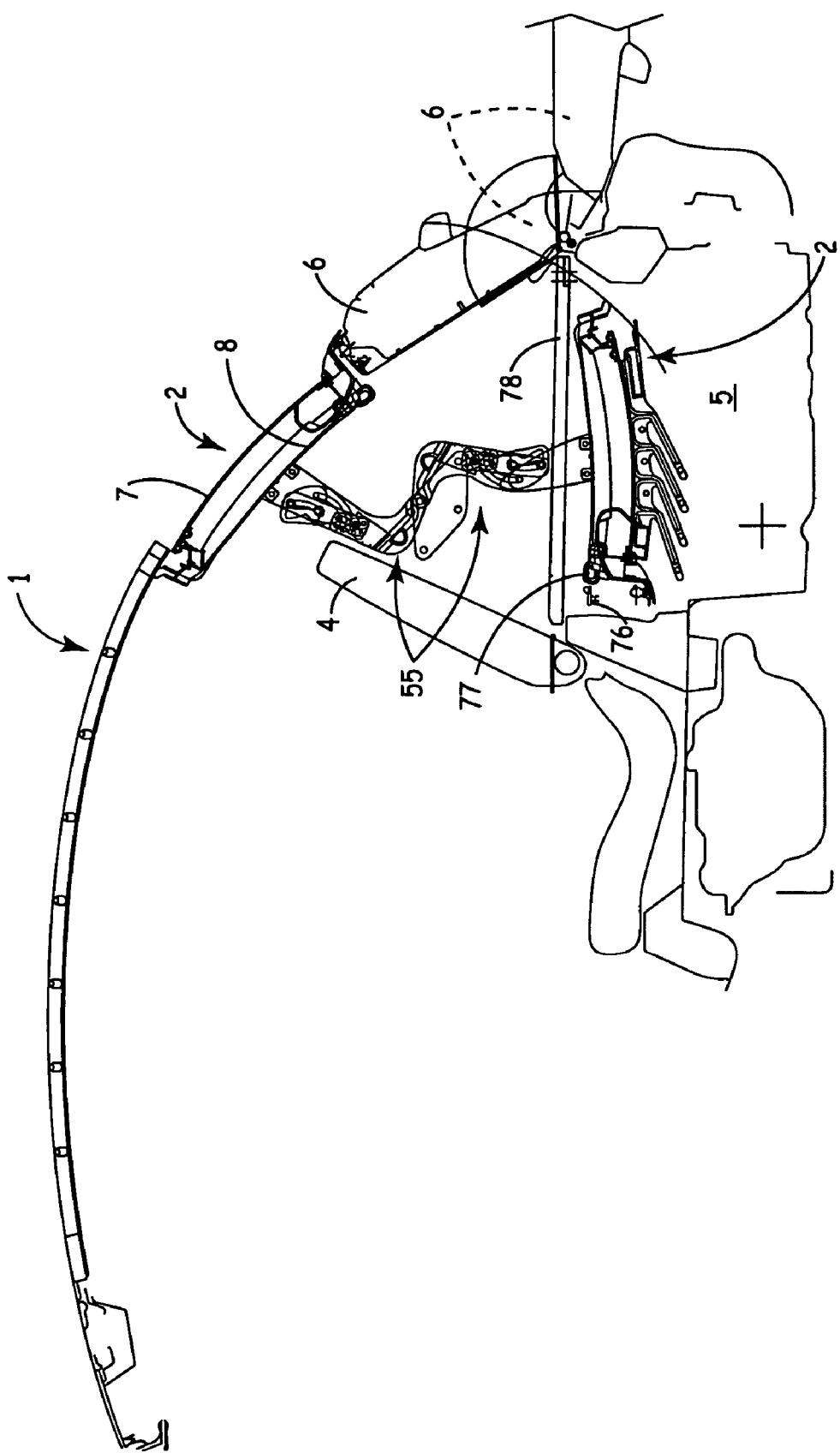

Upon reaching the intermediate position, in which the rear window structure 2 is maximally pivoted outwards (FIG. 10e), the second locking pin 75 of the second arm member 59 has reached the locking portion 74 of the locking slot 73, and as a result of the spring force in anti-clockwise direction, seen in the drawing, the locking portion 74 will automatically slip over the second locking pin 75, thus locking the two arm members 56 and 59 in position with respect to each other. The rear window structure 2 has pivoted so far upwards and outwards in this intermediate position that the hook-shaped members 53, which act as hinges, have moved out of the locking recesses 54 in the counter element 43, or, at any rate, have moved so far outwards that the hook-shaped members 53 do not resist pivoting movement of the rear window structure 2 about the pivot 57 of the arms 55. It is possible, therefore, to lower the rear window structure 2 from this intermediate position and cause it to pivot about the pivot 57, in such a manner that the rear window structure 2 will eventually be accommodated in upside-down position in a hollow space in the boot 5 of the vehicle, in which a locking element 76 engages a part 77 of the frame 8 of the rear window structure 2, thus securing the rear window structure 2 in this lower position (FIG. 10f). The rear window structure 2 can be covered again by means of a floor part 78, so that a boot will be available again, in which luggage can be placed in the closed position of the boot lid 6 and on which large pieces of luggage can be placed in the open position of the boot lid 6.

What is claimed is:

1. A folding roof for a vehicle having a roof opening, the folding roof comprising:

stationary guide rails on either side of the roof opening, wherein the guide rails comprise counter elements;

a flexible liner;

a drivable operating beam on the opening side of said liner, which operating beam is guided in said guide rails for selectively opening and closing the roof opening;

slides which are guided in said guide rails, wherein the slides comprise locking elements and unlocking elements;

a number of folding elements, which support said liner and which define a folding movement thereof upon opening of the folding roof, which folding elements are mounted on the slides; and wherein said counter elements are positioned at such locations that the locking elements can come into engagement with the counter elements in a frontmost position of each of the slides, whereas the unlocking elements unlock the locking elements of the next slide, seen in the opening direction, when the folding roof is being opened, and wherein each locking element, when unlocked from the respective counter element in the guide rail and moved away from it, lock the co-operating unlocking element to an adjacent slide so as to lock successive slides to each other in opened positions of the folding roof.

2. A folding roof for a vehicle having a roof opening, the folding roof comprising:

stationary guide rails on either side of the roof opening, wherein the guide rails comprise counter elements;

a flexible liner;

a drivable operating beam on the opening side of said liner, which operating beam is guided in said guide rails for selectively opening and closing the roof opening;

slides which are guided in said guide rails, wherein the slides comprise locking elements and unlocking elements, wherein the locking elements comprise a movable locking member comprising a projection, whereas the counter element is a recess in the guide rail, in which the projection can engage, and wherein said counter elements are positioned at such locations that the locking elements can come into engagement with the counter elements an a frontmost position of each of the slides, whereas the unlocking elements unlock the locking elements of the next slide, seen in the opening direction, when the folding roof is being opened, and wherein the unlocking elements comprise a projecting part which projects in the direction of the next slide, seen in the opening direction, which is capable of moving the movable locking member for the purpose of moving the projection out of the recess, and wherein the projecting part of the unlocking elements is provided with a pin which can come into engagement with a slot formed on the movable locking member of the locking elements, and wherein the slot extends in a direction that deviates from the direction of movement of the pin;

a number of folding elements, which support said liner and which define a folding movement thereof upon opening of the folding roof, which folding elements are mounted on the slides.

3. The folding roof according to claim 2, wherein the movable locking member, in the position in which it has been moved out of the counter element, mates with the guide rail to lock the pin in the slot so as interlock the adjacent slides into one unit.

* * * * *

UNITED STATES PATENT AND TRADEMARK OFFICE
CERTIFICATE OF CORRECTION

Page 1 of 1

PATENT NO. : 7,334,835 B2
APPLICATION NO. : 11/263201
DATED : February 26, 2008
INVENTOR(S) : Mark A. Gaertner et al.

It is certified that error appears in the above-identified patent and that said Letters Patent is hereby corrected as shown below:

Title page,
Item (75) Inventors insert:

--Peter C.L.J. Manders, Horst (NL);
Martinus W.M. Nabuurs, Overloon (NL)--

Signed and Sealed this
Twenty-ninth Day of November, 2011

David J. Kappos
*Director of the United States Patent and Trademark Office*